(12) United States Patent
Petts et al.

(10) Patent No.: US 10,814,413 B2
(45) Date of Patent: Oct. 27, 2020

(54) SAW BLADE HAVING RAMP ELEMENTS WITH A VARIABLE CURVE GEOMETRY

(71) Applicant: Simonds Saw, LLC, Fitchburg, MA (US)

(72) Inventors: Dale G. Petts, Bedford, NH (US); Keenan Glover, Calonge (ES)

(73) Assignee: Simonds Saw LLC, Fitchburg, MA (US)

(*) Notice: Subject to any disclaimer, the term of this patent is extended or adjusted under 35 U.S.C. 154(b) by 0 days.

(21) Appl. No.: 16/122,403

(22) Filed: Sep. 5, 2018

(65) Prior Publication Data

US 2019/0168321 A1    Jun. 6, 2019

Related U.S. Application Data

(60) Provisional application No. 62/554,268, filed on Sep. 5, 2017.

(51) Int. Cl.
*B23D 61/12* (2006.01)
*B27B 33/06* (2006.01)

(52) U.S. Cl.
CPC .......... *B23D 61/123* (2013.01); *B23D 61/12* (2013.01); *B23D 61/121* (2013.01); *B27B 33/06* (2013.01)

(58) Field of Classification Search
CPC ...... B23D 61/00; B23D 61/12; B23D 61/121; B23D 61/122; B23D 61/123; B23D 61/125; B23D 61/025
See application file for complete search history.

(56) References Cited

U.S. PATENT DOCUMENTS

| | | | | |
|---|---|---|---|---|
| 566,865 A | * | 9/1896 | Morrish | B23D 61/121 83/846 |
| 1,850,478 A | * | 3/1932 | Schaefer | B23D 61/123 83/847 |
| 4,205,571 A | * | 6/1980 | Bertini | B23D 61/123 83/661 |
| 4,423,653 A | * | 1/1984 | Howard | B23D 55/088 83/661 |
| 4,603,613 A | * | 8/1986 | Wilson | B23D 61/123 83/635 |
| 4,967,477 A | * | 11/1990 | Sanford | B26B 9/02 30/314 |
| 5,094,135 A | * | 3/1992 | Nakahara | B23D 61/021 83/847 |

(Continued)

OTHER PUBLICATIONS

RW Ruckenwelle; "KR Saws making waves in the band saw blade market", Feb. 6, 2017.

(Continued)

*Primary Examiner* — Andrea L Wellington
*Assistant Examiner* — Richard D Crosby, Jr.
(74) *Attorney, Agent, or Firm* — Duquette Law Group LLC

(57) ABSTRACT

A saw blade includes a body, saw blade teeth disposed on a first edge of the body, and a ramp element disposed on a second edge of the body, the second edge opposing the first edge. The ramp element is repeated along the longitudinal axis of the body to define a ramp element pattern. The ramp element includes a rise portion disposed proximal to a cutting direction of the saw blade and a relief portion disposed distal to the cutting direction of the saw blade. At least one of the rise portion and the relief portion of the ramp element defines a variable curve geometry.

16 Claims, 28 Drawing Sheets

(56) References Cited

U.S. PATENT DOCUMENTS

| | | | | |
|---|---|---|---|---|
| 5,221,249 A * | 6/1993 | Simpson | ................... | B31F 1/10 |
| | | | | 229/930 |
| 6,532,852 B1 * | 3/2003 | Tsujimoto | ............ | B23D 61/121 |
| | | | | 83/661 |
| 7,017,465 B2 * | 3/2006 | Dion | ...................... | B23D 61/12 |
| | | | | 83/835 |
| D719,791 S * | 12/2014 | Davis | ............................ | D7/672 |
| 2008/0121079 A1 * | 5/2008 | Hashimoto | .......... | B23D 55/082 |
| | | | | 83/14 |
| 2012/0042765 A1 * | 2/2012 | Kazda | ................... | B23D 49/11 |
| | | | | 83/835 |
| 2012/0090443 A1 * | 4/2012 | Butzen | ................ | B23D 61/121 |
| | | | | 83/849 |
| 2013/0227844 A1 * | 9/2013 | Kazda | ................. | B23D 61/123 |
| | | | | 30/392 |
| 2013/0228059 A1 * | 9/2013 | Kazda | ................. | B23D 61/121 |
| | | | | 83/835 |
| 2015/0075346 A1 * | 3/2015 | Kullmann | ............ | B23D 61/123 |
| | | | | 83/661 |
| 2015/0367434 A1 * | 12/2015 | Muti | ................... | B23D 61/123 |
| | | | | 83/848 |
| 2016/0114416 A1 * | 4/2016 | Maiolo | ................ | B23D 61/123 |
| | | | | 83/835 |
| 2016/0167143 A1 * | 6/2016 | Ivner | ................... | B23D 61/123 |
| | | | | 83/835 |
| 2019/0168321 A1 * | 6/2019 | Petts | ................... | B23D 61/121 |
| 2020/0015832 A1 * | 1/2020 | Levine | ................... | A61B 13/00 |

OTHER PUBLICATIONS

International Search Report dated Dec. 7, 2018 from corresponding International Application No. PCT/US2018/049600.

\* cited by examiner

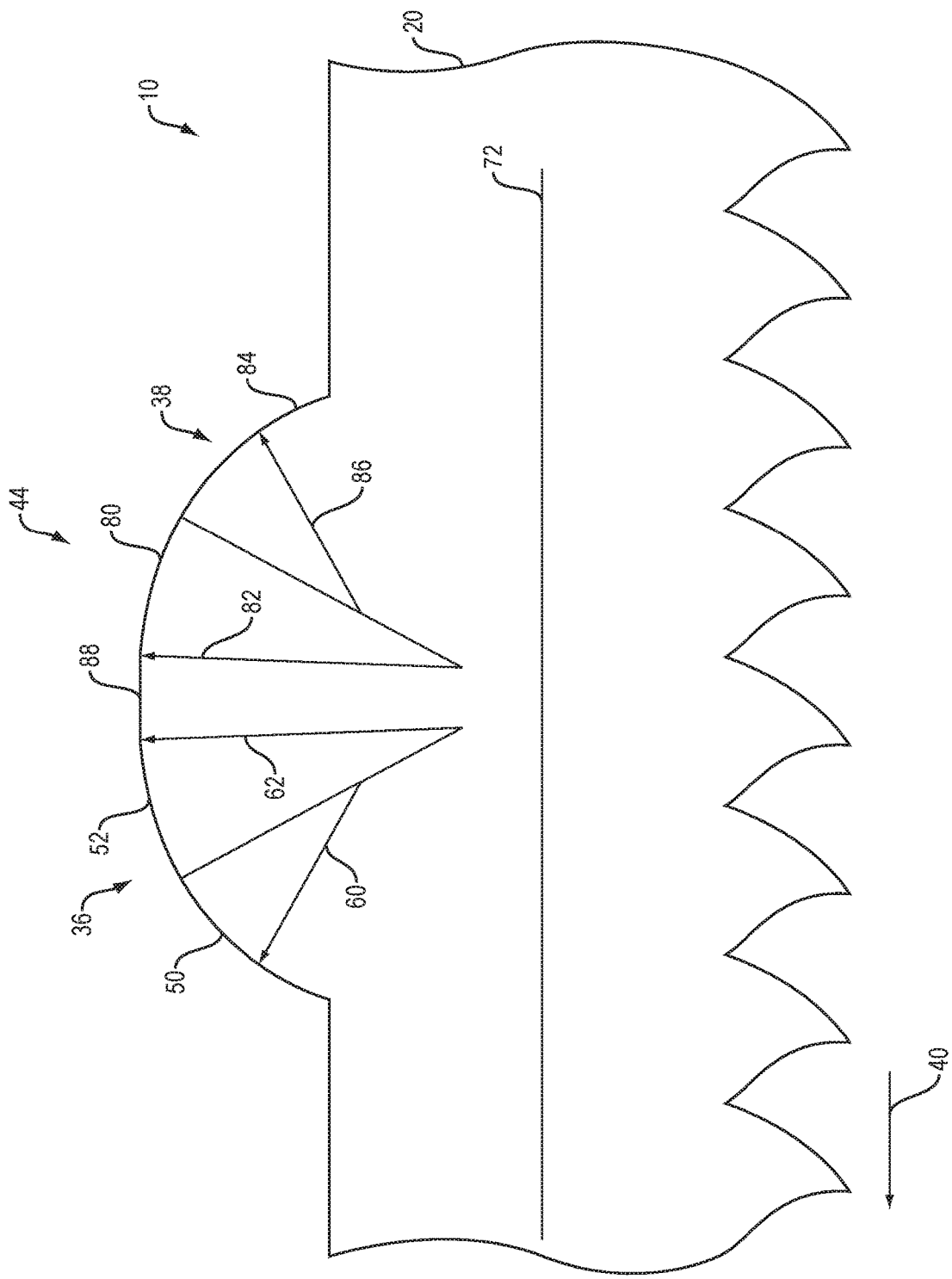

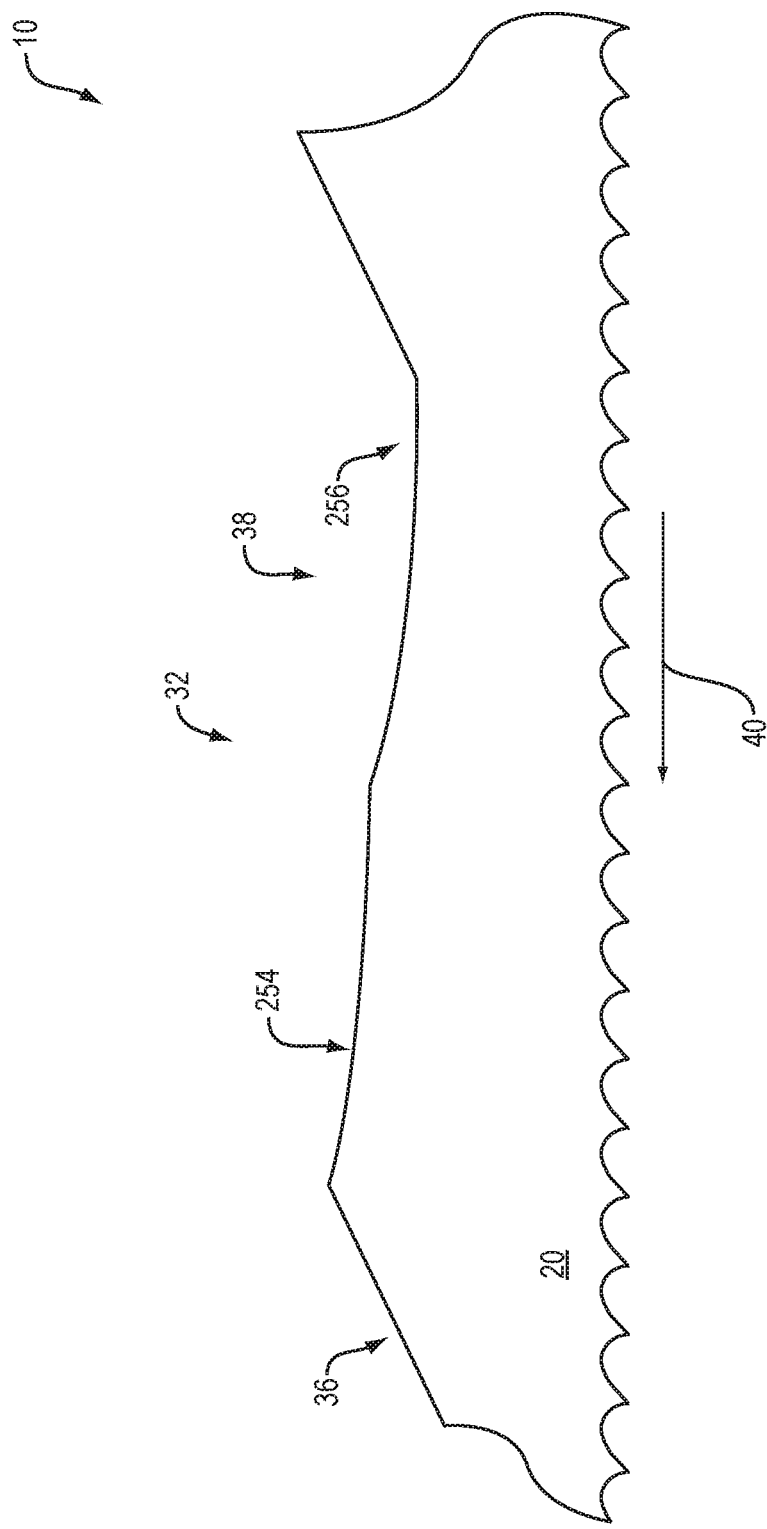

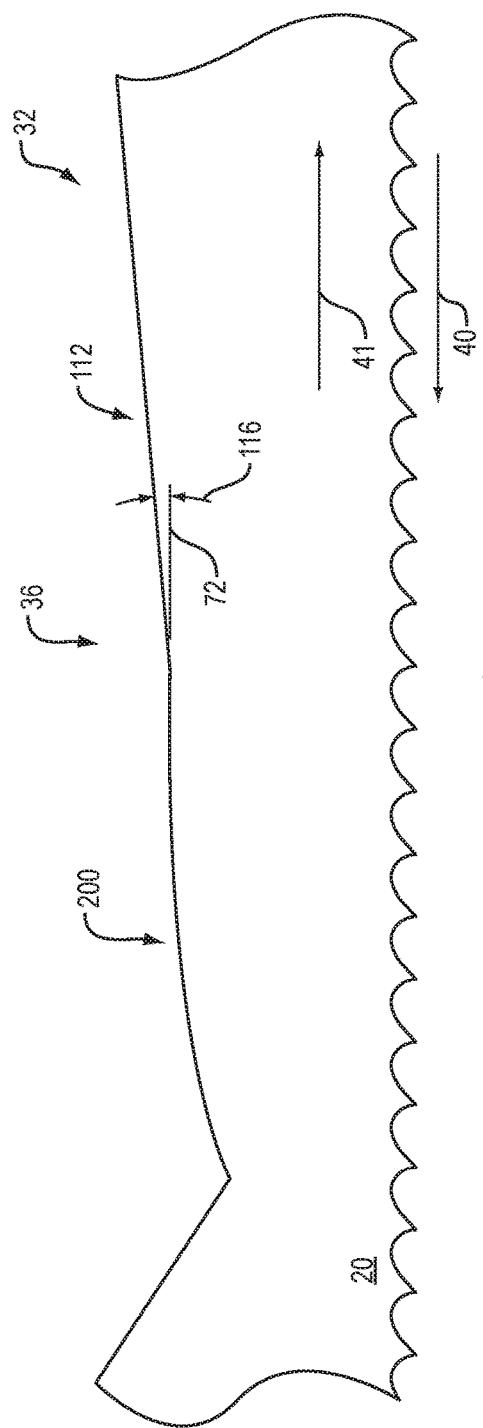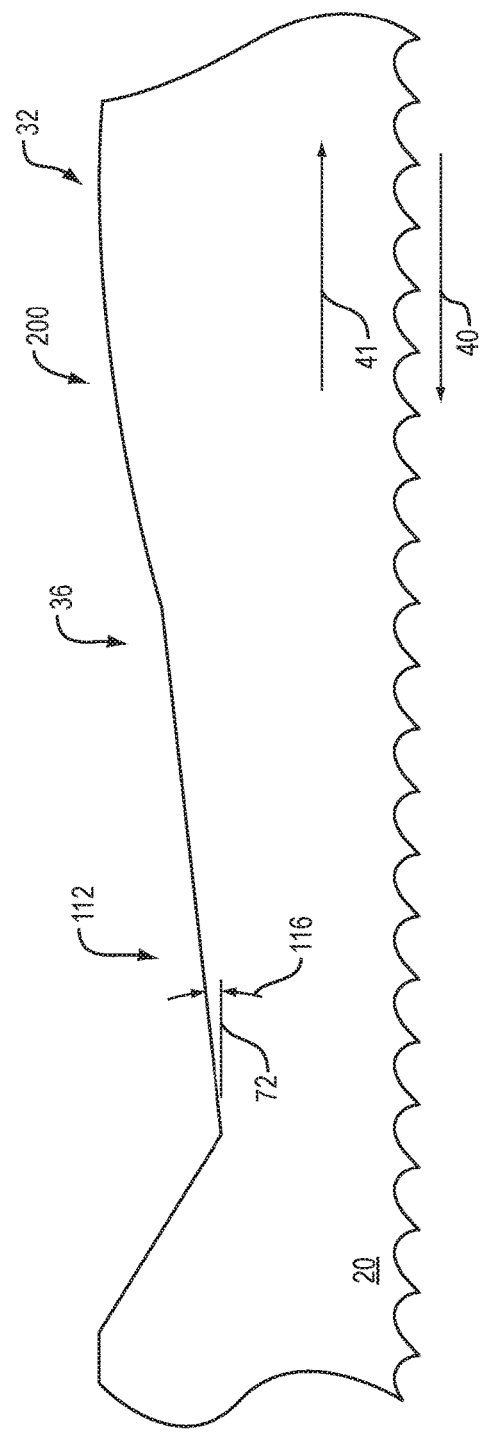

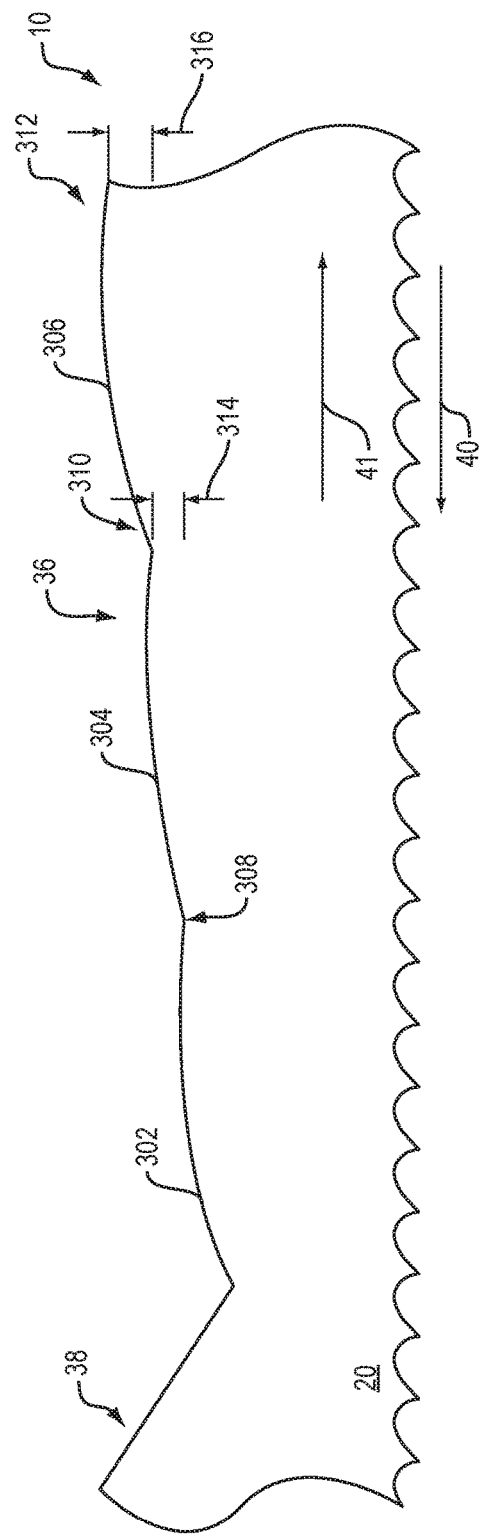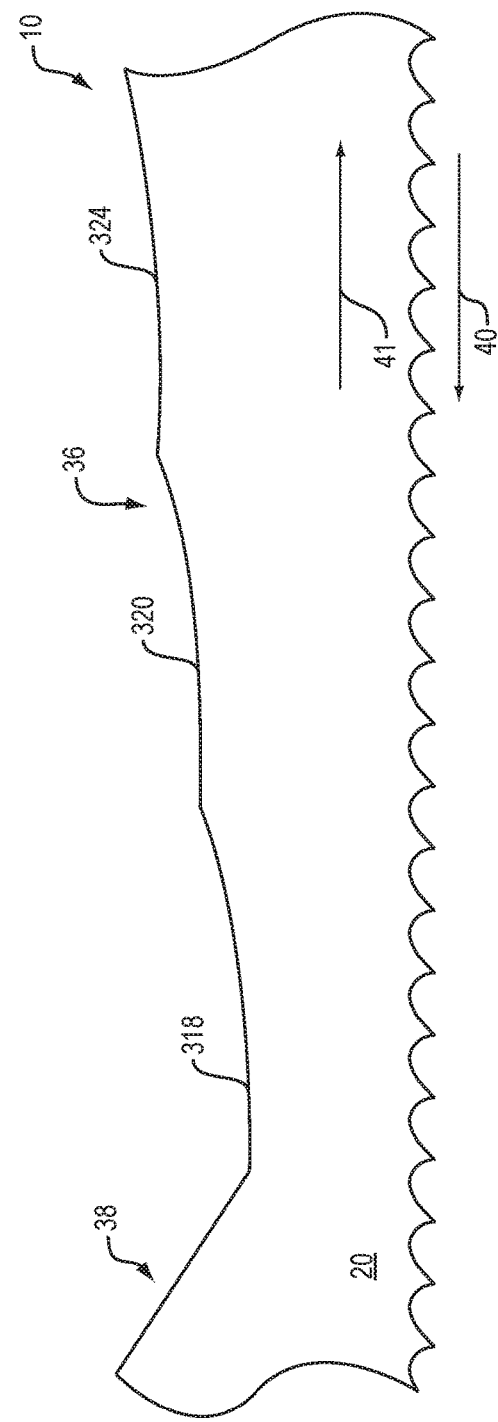

SAW BLADE HAVING RAMP ELEMENTS WITH A VARIABLE CURVE GEOMETRY

RELATED APPLICATIONS

This patent application claims the benefit of U.S. Provisional Application No. 62/554,268 filed on Sep. 5, 2017, entitled, "Saw Blade Having Ramp Elements with a Variable Curve Geometry," the contents and teachings of which are hereby incorporated by reference in their entirety.

BACKGROUND

Saw blades, such as bandsaw blades, are used to cut materials to a desired size with a minimum of material waste and energy consumption. Work piece materials, such as metals, can create varying degrees of machining difficulty due in part to the alloying or heat-treatment of the materials or to the phenomenon known as work-hardening. To address the relative difficulty of machining metal work pieces, bandsaw blade cutting systems have been developed. For example, certain bandsaw cutting systems include a bandsaw blade looped about a pair of drive wheels. At a location approximately midway between the drive wheels of the band saw, the cutting system includes a pair of pressure guides that are spaced apart a distance greater than the cross-sectional size of work pieces to be cut by the system. These pressure guides apply pressure to the back edge of the blade as the sawtooth edge cuts through the work piece.

With these bandsaw cutting systems, the back edge of the bandsaw blade can be manufactured in a non-straightback cutting configuration. Here, the back edge of the bandsaw blade defines a non-straight edge, such as a sinusoidal edge pattern or a stepped edge pattern, which is non-parallel to the cutting edge of the bandsaw blade. As the pressure guides contact the non-straight contour of the back edge of the bandsaw blade, interaction between the pressure guides and the bandsaw blade causes the bandsaw blade to rock in a plane relative to the work piece while the blade advances through the material.

SUMMARY

Conventional non-straight back edge bandsaw blades suffer from a variety of deficiencies. As indicated above, both sinusoidal and stepped back edge patterns allow the pressure guides of the aforementioned bandsaw cutting systems to create a generally curved cut pattern within the cut plane of the work piece. Conventional non-straight back edge blades are configured such that some teeth within the pattern experience substantially higher pressure than others within the pattern. This causes dissimilar wear among the teeth and increases the potential for earlier failure in the life cycle of the blade versus other teeth within a given pattern.

By contrast to conventional non-straight back edge bandsaw blades, embodiments of the present innovation relate to a saw blade having ramp elements with a variable curve geometry. In one arrangement, a saw blade body includes a cutting edge and an opposing back edge configured to abut pressure guides of a bandsaw cutting system. The back edge of the saw blade body includes ramp elements repeated along the longitudinal axis of the body where each ramp element includes a rise portion and a relief portion. Either one, or both, of the rise and relief portions are configured with a variable curve geometry such that the curvature of the portions varies along the length of the bandsaw blade. For example, either one or both of the rise and relief portions can be configured with compound radii such that either one or both of the rise and relief portions include at least two arcs having distinct radii. In another example, either one or both of the rise and relief portions can be configured with an elliptical or variable radius geometry that changes along the length of the bandsaw blade. In another example, either one or both of the rise and relief portions can be configured with a multiple angle geometry such that either one or both of the rise and relief portions include at least two linear portions having distinct angles. With such geometries of the back edge, during operation, interaction between the pressure guides of a cutting system and the bandsaw mitigates non-uniform cutting pressure applied by the blade to a work piece. This allows an operator to contour the motion of a blade to the bandsaw cutting system used, as well as to the application, such as the type of material being cut. Further, with the non-uniform cutting pressure mitigated, the saw blade experiences a more uniform wear pattern on its teeth which results in an improved blade life.

In one arrangement, a saw blade includes a body, saw blade teeth disposed on a first edge of the body, and a ramp element disposed on a second edge of the body, the second edge opposing the first edge. The ramp element is repeated along the longitudinal axis of the body to define a ramp element pattern. Each ramp element can include a rise portion disposed proximal to a cutting direction of the saw blade and a relief portion disposed distal to the cutting direction of the saw blade. At least one of the rise portion and the relief portion of the ramp element defines a variable curve geometry.

In one arrangement, at least one of the rise portion or the relief portion of the ramp element can define a compound planar geometry. Further, certain conventional geometries of the back edge of a band saw blade include a relatively long entry ramp and a relatively short exit ramp. Other conventional geometries of the back edge of a band saw blade include a relatively short entry ramp and a relatively long exit ramp. It is noted that the multi-plane and multi-curve combinations can be applied to either type of geometry; relatively long entry ramps and relatively short exit ramps or relatively short entry ramps and relatively long exit ramps.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 3A illustrates a section of a saw blade having a ramp element that includes a rise portion having a convex, compound radius geometry, a relief portion having a convex, compound radius geometry, and a horizontal portion disposed there between, according to one arrangement.

FIG. 10 illustrates a section of a saw blade with the rise portion of a ramp element including a convex elliptical portion disposed in series with, and proximal to, a linear portion.

FIG. 11 illustrates a section of a saw blade with the rise portion of the ramp element including a linear portion disposed in series with, and proximal to, a convex elliptical portion.

FIG. 12A illustrates a section of a saw blade with a rise portion having three consecutively disposed convex elliptical geometries.

FIG. 13A illustrates a section of a saw blade with a rise portion having three consecutively disposed concave elliptical geometries.

DETAILED DESCRIPTION

Embodiments of the present innovation relate to a saw blade having ramp elements with a variable curve geometry. In one arrangement, a saw blade body includes a cutting edge and an opposing back edge configured to abut pressure guides of a bandsaw cutting system. The back edge of the saw blade body includes a ramp element repeated along the longitudinal axis of the body where the ramp element includes a rise portion and a relief portion. Either one, or both, of the rise and relief portions are configured with a variable curve geometry such that the curvature of the portions varies along a length of the bandsaw blade. For example, either one or both of the rise and relief portions can be configured with compound radii such that either one or both of the rise and relief portions include at least two arcs having distinct radii. In another example, either one or both of the rise and relief portions can be configured with an elliptical or variable radius geometry that changes along the length of the bandsaw blade. In another example, either one or both of the rise and relief portions can be configured with a multiple angle geometry such that either one or both of the rise and relief portions include at least two linear portions having distinct angles.

Figure 1:
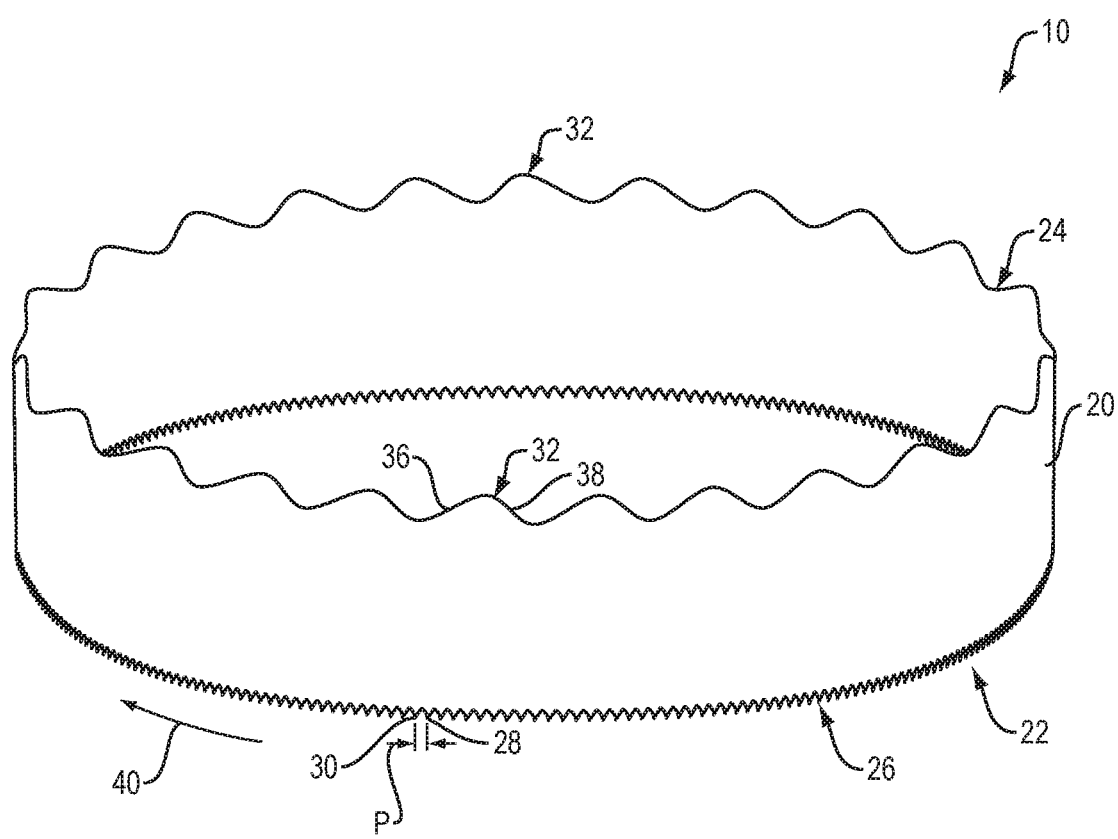
FIG. 1 illustrates a saw blade having a set of ramp elements, at least a portion of each defining a variable curve geometry, according to one arrangement.

With such geometries of the back edge, during operation, interaction between the pressure guides of a cutting system and the saw blade mitigates non-uniform cutting pressure applied by the blade to a work piece. This allows an operator to contour the motion of a blade to the bandsaw cutting system used, as well as to the application, such as the type of material being cut. Further, with the non-uniform cutting pressure mitigated, the bandsaw blade experiences a more uniform wear pattern on its teeth which results in an improved blade life. FIG. 1 illustrates a saw blade 10, such as a bandsaw blade, according to one arrangement. The saw blade 10 includes a saw blade body 20 having a toothed edge 22 and an opposing back edge 24.

The toothed edge 22 includes a set of teeth 26 disposed thereon where each tooth of the set of teeth 26, is disposed on the saw blade body 20 at a relative tooth spacing or pitch P. For example, for each tooth of the set of teeth 26, the pitch P is defined as a distance between a tooth point of a respective tooth 28 and a tooth point of a preceding tooth 30 where the preceding tooth 30 is disposed proximate to a front end portion of the respective tooth 28. The set of teeth 26 can be arranged in a toothform pattern having a number of set teeth disposed on the saw blade body 20 in a respective right or left set direction relative to a midplane of the saw blade body 20, as well as a non-set or raker tooth. This toothform pattern can be repeated along the length of the saw blade 10.

The back edge 24 of the saw blade body 20 includes a set of ramp elements 32 repeated along the back edge 24 of the saw blade 10. As the saw blade 10 is configured to operate in a substantially continuous manner, such as part of a pressure guided bandsaw cutting system, the ramp elements 32 are configured to vary the planar positioning of the saw blade 10 relative to a work piece to allow the blade 10 to progress through the work piece during operation in a substantially efficient manner.

Each ramp element 32 includes a rise portion 36 disposed proximal to a cutting direction 40 of the saw blade 10 and a relief portion 38 disposed distal to the cutting direction 40 of the saw blade 10. As will be described in detail below, at least one of the rise portion 36 and the relief portion 38 of the ramp element 32 is configured with a variable curve geometry. With a variable curve geometry, the curvature of at least one of the rise portion 36 and the relief portion 38 of the ramp element 32 varies (i.e., increases or decreases) along a length of the bandsaw blade. In use, as the pressure guides of a bandsaw cutting system contact the variable curve geometry of the ramp elements 32, the bandsaw blade 10 to apply a non-uniform cutting pressure to a work piece during operation. With such a configuration of the ramp elements 32, an operator can contour the motion of a blade 10 to the bandsaw cutting system used, as well as to the application, such as the type of material being cut.

The variable curve geometry of the ramp elements 32 can be configured in a variety of ways. In one arrangement, either one or both of the rise and relief portions 36, 38 of the ramp elements 32 can be configured with compound radii as the variable curve geometry.

Figure 2A:
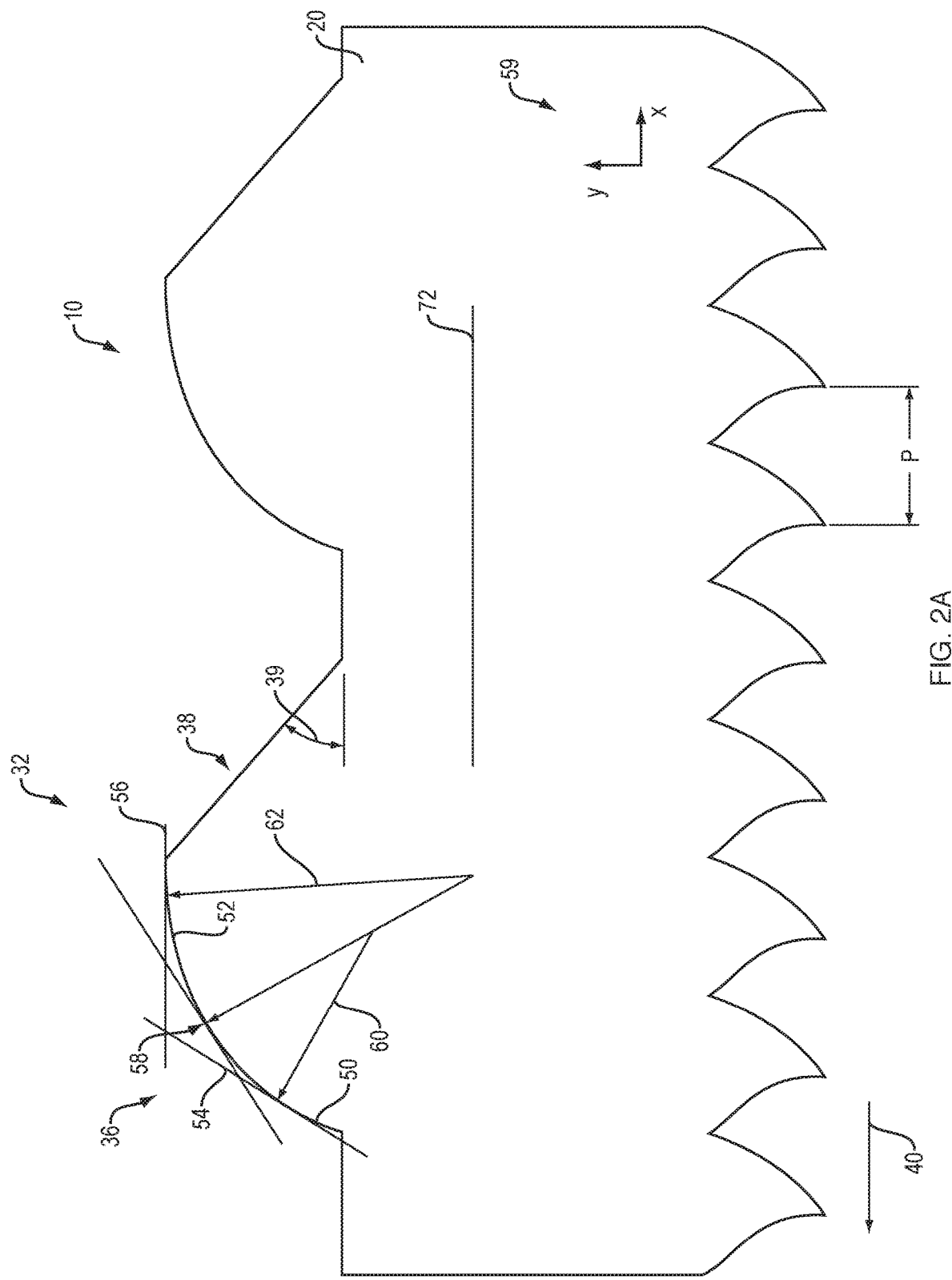
FIG. 2A illustrates a section of a saw blade having a ramp element that includes a rise portion having a convex, compound radius geometry and an angled relief portion, according to one arrangement.

With reference to FIG. 2A, the compound radius geometry of the rise portion 36 of the ramp element 32 can include two or more convex curve portions 50, 52 disposed between two tangent lines 54, 56 of the ramp element 32, respectively, and joined at a point of compound curvature 58. As illustrated, each of the first and second convex curve portions 50, 52 includes a rounded surface that extends outwardly from the saw blade body 20 within an X-Y plane 59. Further, each of the convex curve portions 50, 52 is defined by a distinct radius such that the radius for each of the first and second convex curve portions 50, 52 is unequal to the other. For example, the first rise portion 50 is defined by a first radius of curvature 60 and the second rise portion 52 is defined by a second radius of curvature 62. As illustrated, the second radius of curvature 62 is greater than the first radius of curvature 60. However, it should be understood that the second radius of curvature 62 can also be smaller than the first radius of curvature 60.

The compound radius geometry of the rise portion 36 of a ramp element 32 can be combined with a relief portion 38 having a variety of geometries.

Figure 2B:
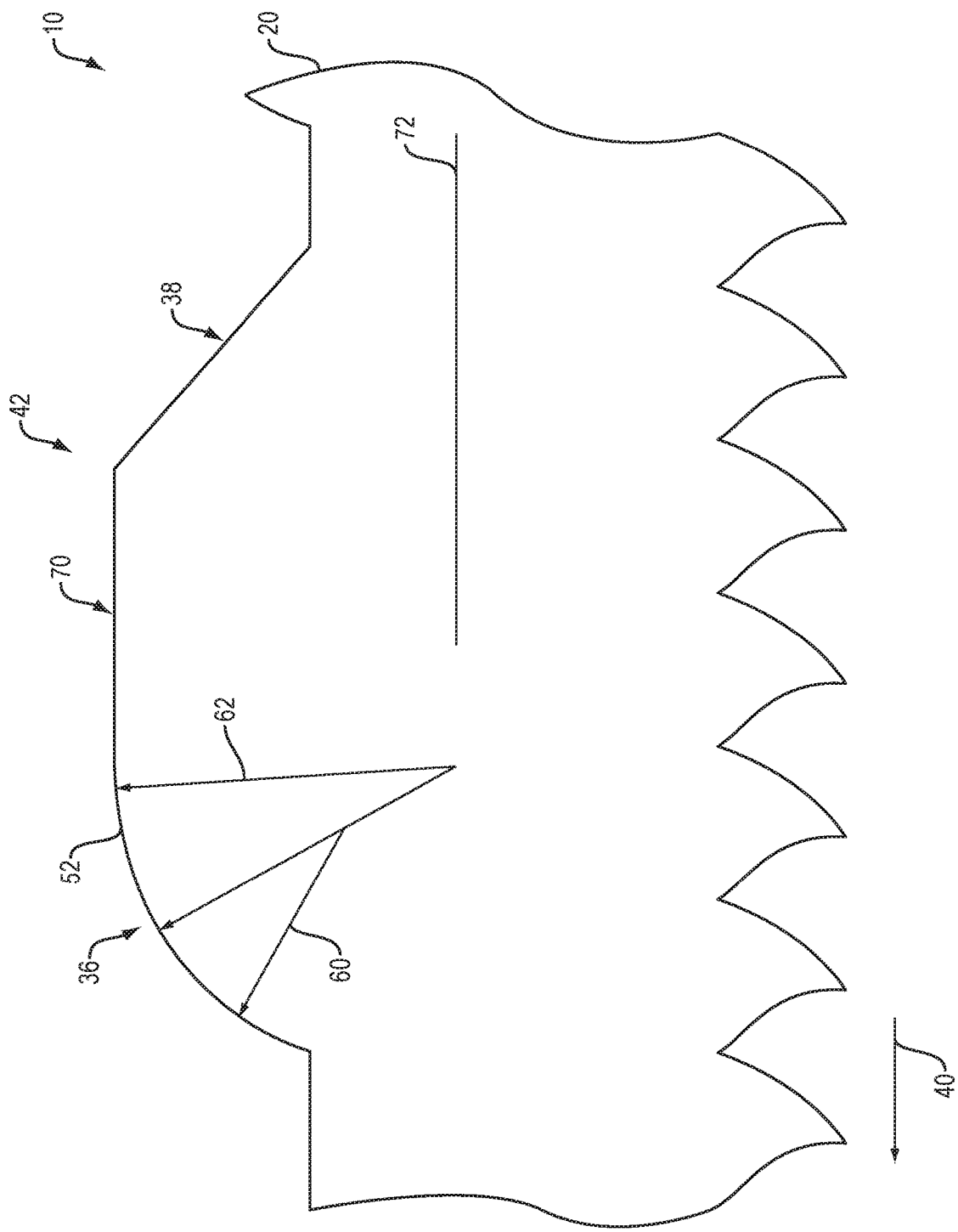
FIG. 2B illustrates a section of a saw blade having a ramp element that includes a rise portion having a convex, compound radius geometry, an angled relief portion, and a horizontal portion disposed there between, according to one arrangement.

For example, with respect to the ramp element 32 illustrated in FIG. 2A the second convex curve portion 52 adjoins a relief portion 38 configured with a linear geometry which defines an angle 39 relative to a longitudinal axis 72 of the saw blade body 20. In another example, FIG. 2B illustrates a substantially horizontal portion 70 disposed between the second convex curve portion 52 of the and the relief portion 38 where the horizontal portion 70 is substantially parallel to the longitudinal axis 72 of the saw blade body 20. In this configuration, the horizontal portion 70 is configured to provide a substantially smooth transition between the rise portion 36 and the relief portion 38 during operation.

Figure 2C:
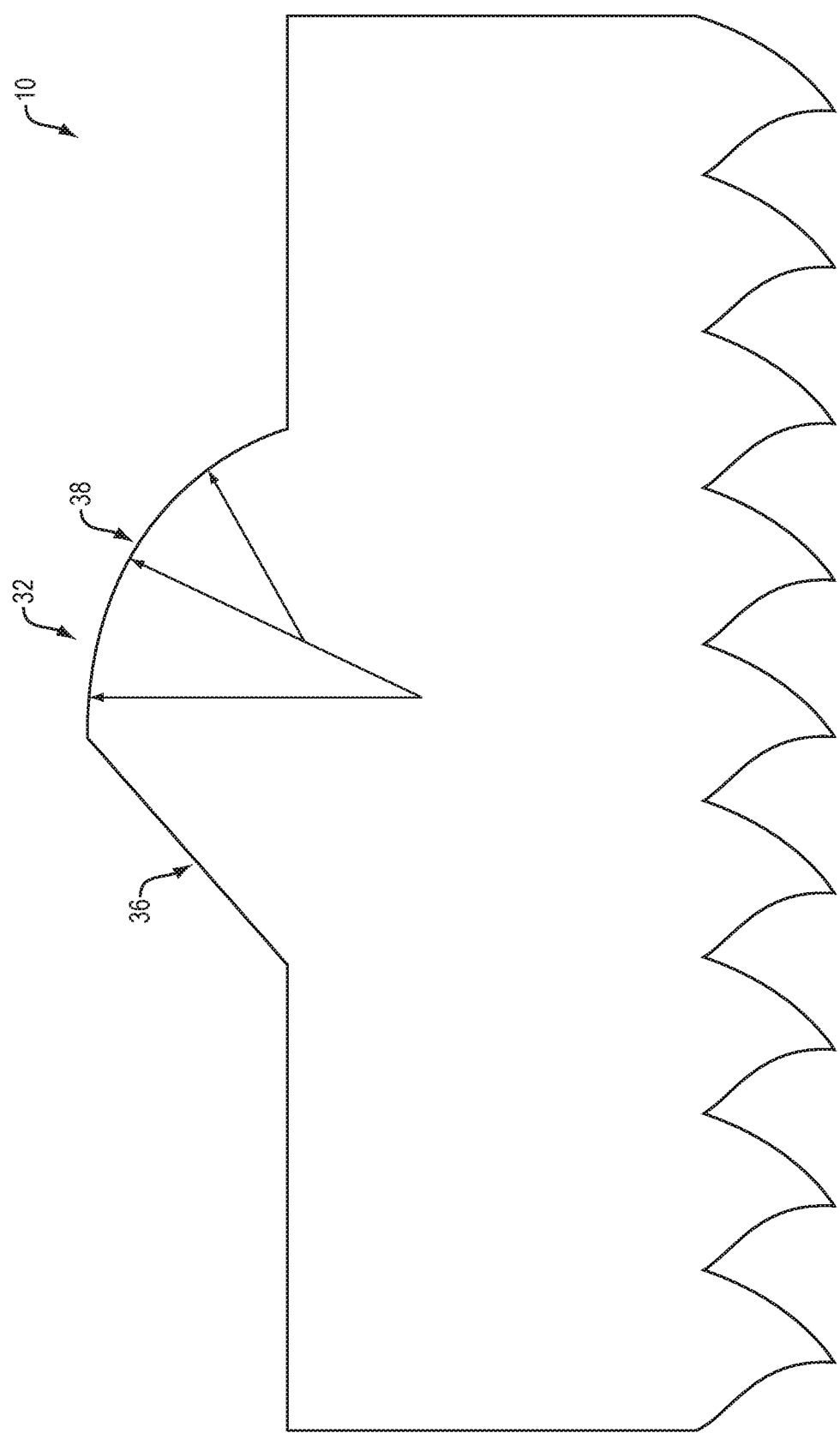
FIG. 2C illustrates a section of a saw blade having a ramp element that includes a relief portion having a convex, compound radius geometry and an angled relief portion, according to one arrangement.

As provided above, the rise portion 36 of a ramp element 32 can be configured with a convex, compound radius geometry. In one arrangement, as illustrated in FIG. 2C, the relief portion 38 of a ramp element 32 can be configured with a convex, compound radius geometry. In another arrangement, FIG. 3A illustrates the relief portion 38 of a ramp element 44 as also defining a convex, compound geometry. For example, the relief portion 38 includes a first convex curve portion 80 defined by a first radius of curvature 82 and a second convex curve portion 84 defined by a second radius of curvature 86. Also as shown, the first radius of curvature 82 is unequal to the second radius of curvature 86. For example, as shown, the second radius of curvature 86 is smaller than the first radius of curvature 82. However, it should be understood that the second radius of curvature 86 can be larger than the first radius of curvature 82.

Further, FIG. 3A indicates that the first convex curve portion 50 has a radius of curvature 60 that is substantially equal to the radius of curvature 86 of the second convex curve portion 84 and that the second convex curve portion 52 has a radius of curvature 62 that is substantially equal to the radius of curvature 82 of the first convex curve portion 80. Such illustration is by way of example only. In one arrangement, the radius of curvature 60 the first convex curve portion 50 is unequal to (i.e., greater than or less than) the radius of curvature 86 of the second convex curve portion 84. Additionally, in one arrangement, the radius of curvature 62 the second convex curve portion 52 is unequal to (i.e., greater than or less than) the radius of curvature 82 of the first convex curve portion 80.

With continued reference to FIG. 3A, the ramp element 44 can include a substantially horizontal portion 88 disposed between the second rise portion 56 and the first relief portion 80 where the horizontal portion 88 is substantially parallel to the longitudinal axis 72 of the saw blade body 20. In this configuration, the horizontal portion 88 is configured to provide a substantially smooth transition between the second convex curve portion 56 and the first convex curve portion 80 during operation.

Figure 3B:
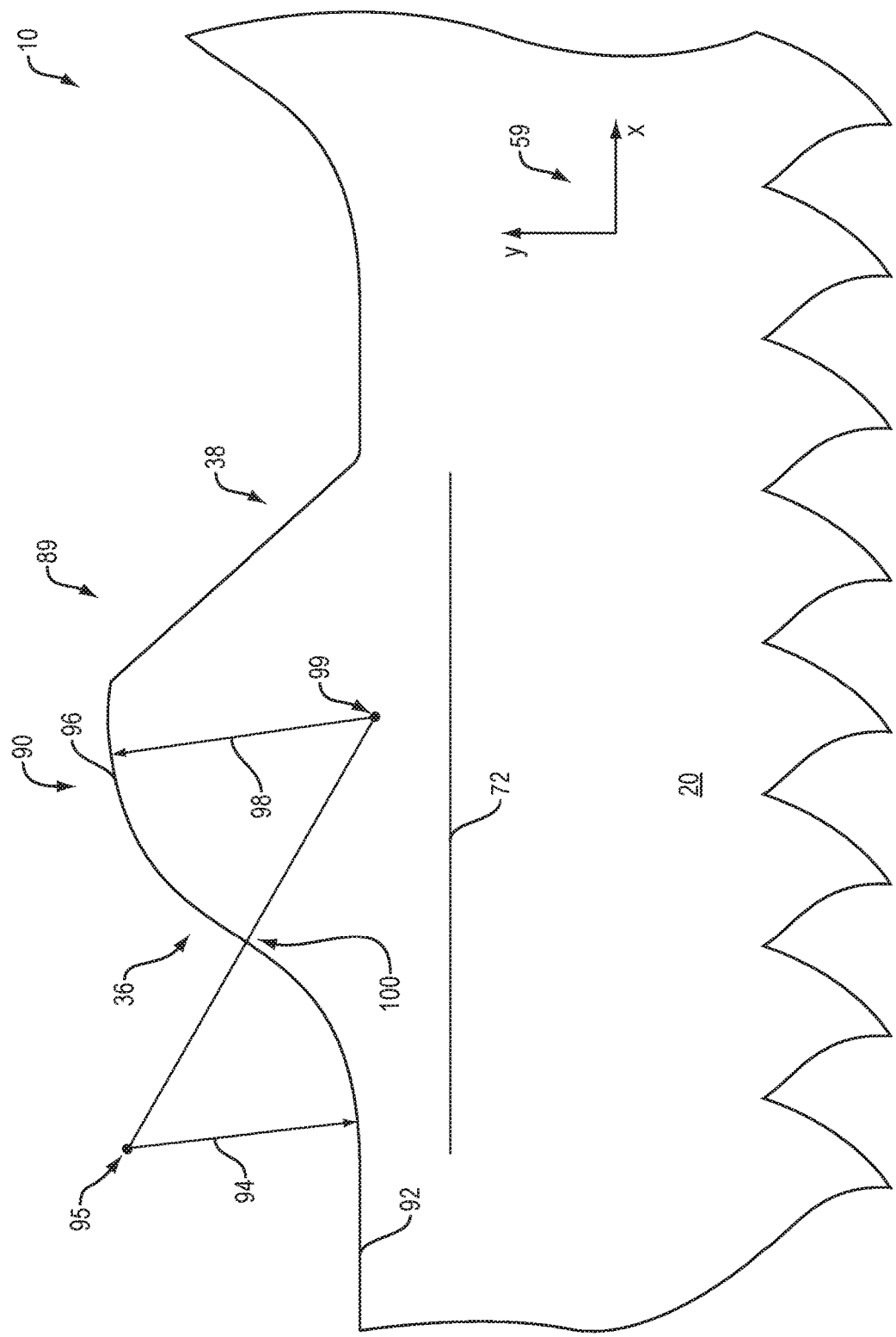
FIG. 3B illustrates a section of a saw blade having a ramp element that includes a rise portion having a concave and convex compound curve geometry and an angled relief portion, according to one arrangement.
Figure 3C:
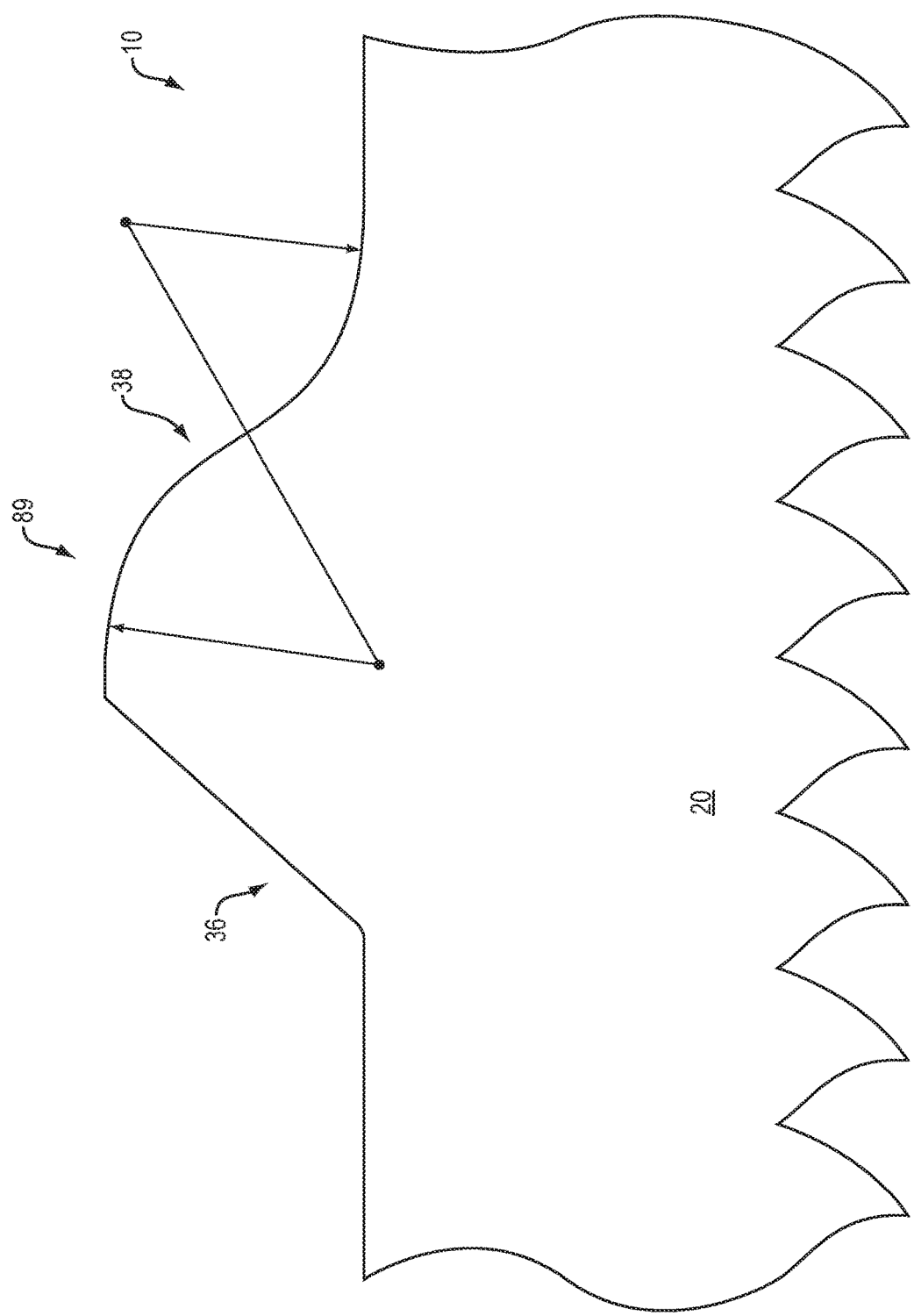
FIG. 3C illustrates a section of a saw blade having a ramp element that includes a relief portion having a concave and convex compound curve geometry and an angled rise portion, according to one arrangement.

In one arrangement, the variable curve geometry of the rise portion 36 (as shown in FIG. 3B) and/or the relief portion 38 (as shown in FIG. 3C) of a ramp element 89 can be configured as a reverse curve 90 having a concave and convex compound curve geometry. For example, with reference to FIG. 3B, the rise portion 36 includes a reverse curve 90 having a first portion 92 defining a first radius of curvature 94 relative to point 95 external to the body 20 of the saw blade 10 and a second portion 96 defining a second radius of curvature 98 relative to a point 99 disposed on the body 20 of the saw blade 10. The first portion 92 is configured with a substantially concave geometry relative to the longitudinal axis 72 and the second portion 96 is configured with a substantially convex geometry relative to the longitudinal axis 72. A point of reversed curvature 100 serves as the inflection point between the first and second portions 92, 96.

In one arrangement, the first radius of curvature 94 is configured as being unequal to the second radius of curvature 98. For example, the second radius of curvature 98 can be larger than the first radius of curvature 94. However, it should be understood that the second radius of curvature 98 can also be smaller than the first radius of curvature 94 or equal to the first radius of curvature 94. The variable curve geometry of the ramp elements 32 can be configured in a variety of ways.

As illustrated, the reverse curve 90 having the compound radius includes the first portion 92 configured with a substantially concave geometry relative to the longitudinal axis 72 and the second portion 96 configured with a substantially convex geometry relative to the longitudinal axis 72. As illustrated, the first portion 92 of the reverse curve 90 defines, as the concave geometry, a rounded surface that extends inwardly from the external point or location 95 relative to the longitudinal axis 72 and to the saw blade body 20 within the X-Y plane 59. Also as illustrated, the second portion 96 of the reverse curve 90 defines, as the convex geometry, a rounded surface that extends outwardly relative to point 99 and the longitudinal axis 72 and to the saw blade body 20 within the X-Y plane 59.

The reverse curve 90 of the rise portion 36 of a ramp element can be combined with a relief portion 38 having a variety of geometries. In one arrangement, with respect to the ramp element 89 illustrated in FIG. 3B, the relief portion 38 configured with an angled, linear geometry. Alternately, the relief portion 38 can be configured as an angled, linear geometry having a substantially horizontal portion (e.g., as shown in FIG. 3A), as having a variable radius geometry (e.g., as shown in FIGS. 4A and 4B), or as a reverse curve (e.g., as shown in FIG. 3C).

As provided above, the variable curve geometry of the ramp elements 32 can be configured in a variety of ways. In one arrangement, either one or both of the rise and relief portions 36, 38 of the ramp elements 32 can be configured with an elliptical or variable radius geometry. FIGS. 4A and 4B provide examples of a rise portion 36 of a ramp element 32 as including the variable radius geometry such as a convex elliptical geometry or a concave elliptical geometry.

In one arrangement, the rise portion 36 can be configured with a convex elliptical or variable radius geometry. FIG. 4A illustrates an example of the ramp element 32 where a focal length L of the convex elliptical rise portion 36 changes along a direction 41 opposite to the cutting direction 40 of the saw blade 10. The focal length L is defined as the distance between a focus F of a portion of an ellipse, as disposed on the saw blade body 20, and an outer periphery of the back edge 24. As such, the change in the focal length L defines the convex elliptical geometry of the rise portion 36. For example, taking five focal lengths $L_1, L_2, L_3, L_4$, and $L_5$ of the rise portion 36 from a proximal location 65 of the rise portion 36 to a distal portion 67 of the rise portion 36, the focal lengths L change, and in this example increase, along direction 41 and define the convex elliptical shape. As shown in this example, $L_5 > L_4 > L_3 > L_2 > L_1$ In one arrangement, the rise portion 36 can be configured with a concave elliptical or variable radius geometry. FIG. 4B illustrates an example where the ramp element 32 where a focal length L of a concave elliptical rise portion 36 changes along a direction 41 opposite to the cutting direction 40 of the saw blade 10. The focal length L is defined as the distance between a focus F of a portion of an ellipse, as disposed at a location external to the saw body 20 and in proximity to the back edge 24, and an outer periphery of the back edge 24. As such, the change in the focal length L defines the concave elliptical geometry of the rise portion 36. For example, taking five focal lengths $L_1, L_2, L_3, L_4$, and $L_5$ of the rise portion 36 from a proximal location 69 of the rise portion 36 to a distal portion 71 of the rise portion 36, the focal lengths $L_1$ through $L_5$ change and in this example increase, along direction 41 and define the concave elliptical shape. As shown in this example, $L_5 > L_4 > L_3 > L_2 > L_1$.

Figure 4A:
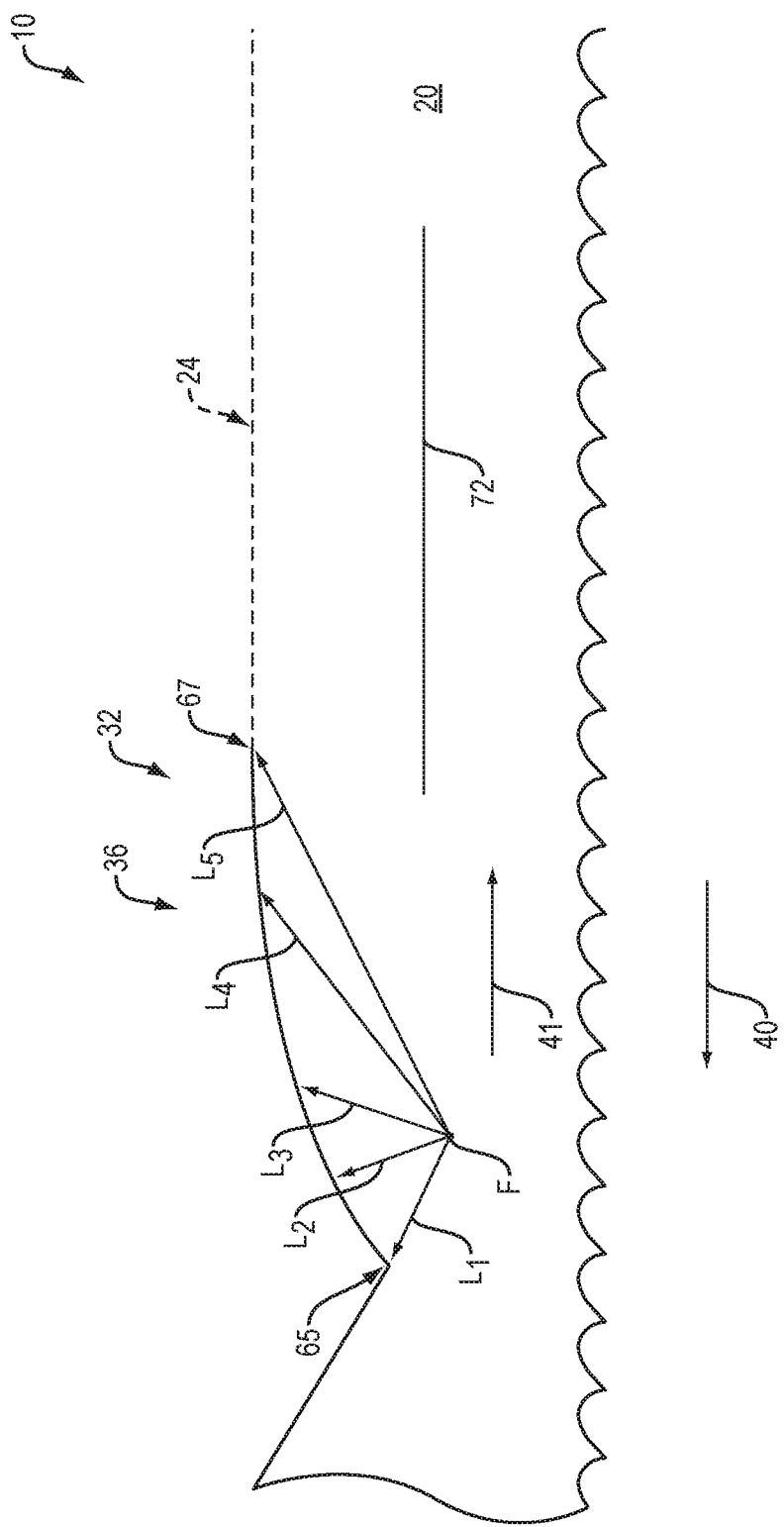
FIG. 4A illustrates a section of a saw blade having a ramp element that includes a rise portion having a convex, elliptical radius curve geometry, according to one arrangement.
Figure 4B:
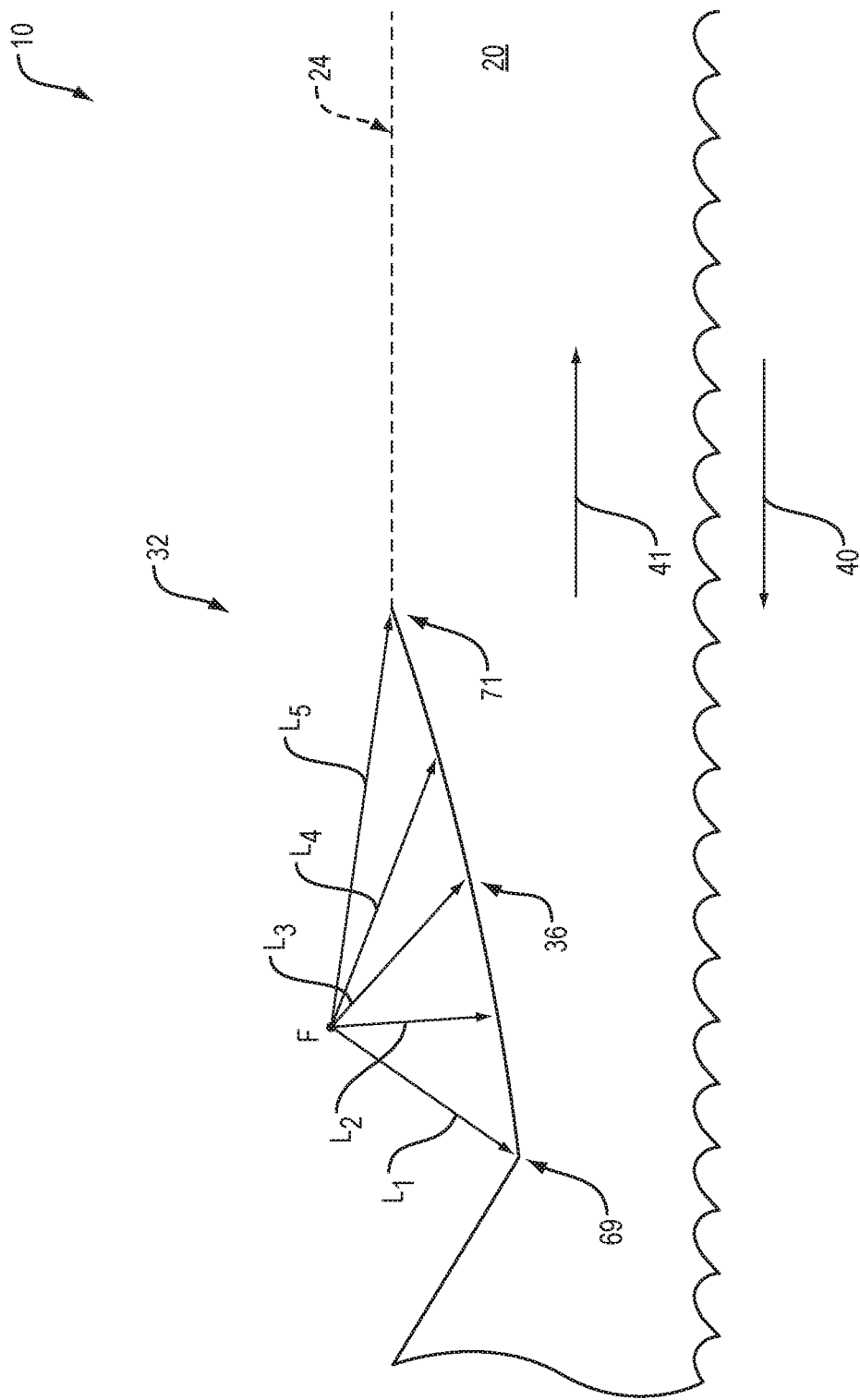
FIG. 4B illustrates a section of a saw blade having a ramp element that includes a rise portion having a concave, elliptical radius curve geometry, according to one arrangement.

In the case where the ramp element 32 is configured as either a convex elliptical rise portion as shown in FIG. 4A or a concave elliptical rise portion 36 as shown in FIG. 4B, the relief portion 38 can define any of variety of geometries. For example, the relief portion 38 can be configured with an angled, linear geometry, a substantially horizontal linear geometry disposed between the rise portion 36 and the relief portion 38, a variable radius geometry, a reverse curve geometry, or a variety of other geometries.

Figure 4C:
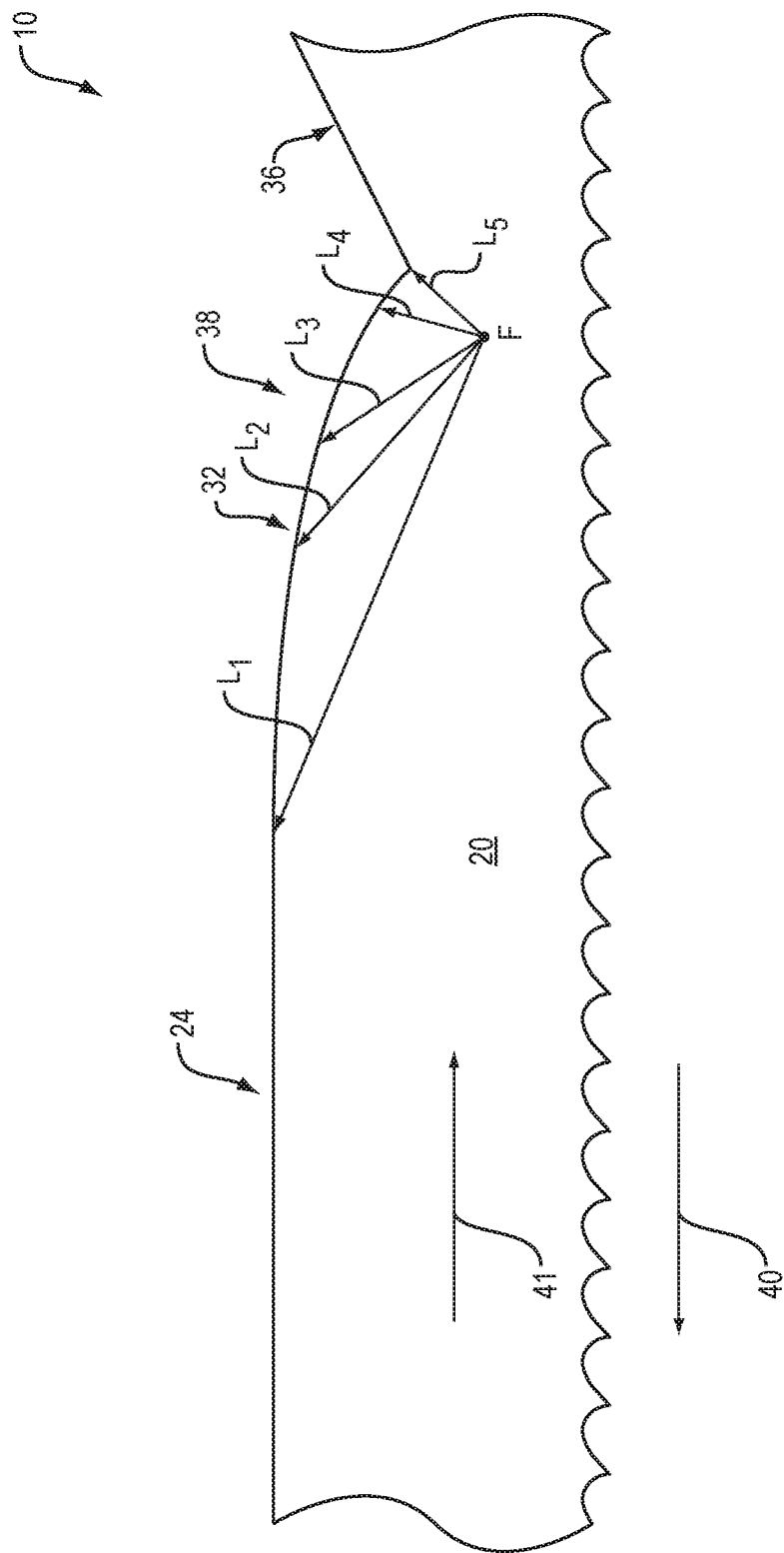
FIG. 4C illustrates a saw blade having a ramp element that includes a relief portion having a convex, elliptical radius curve geometry, according to one arrangement.
Figure 4D:
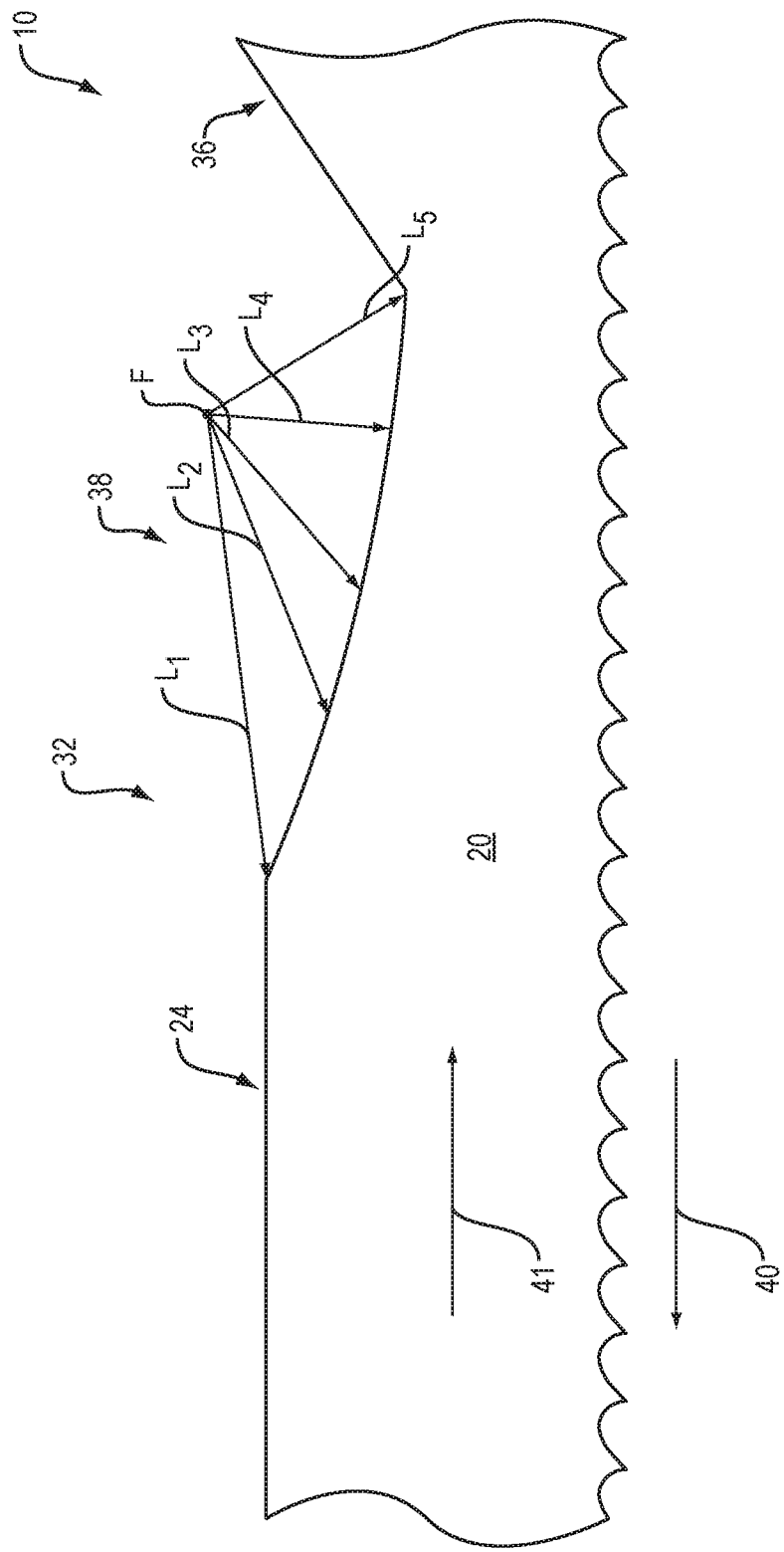
FIG. 4D illustrates a saw blade having a ramp element that includes a relief portion having a concave, elliptical radius curve geometry, according to one arrangement.

As provided above, in one arrangement, the relief portion 38 can be also be configured with either a convex elliptical or variable radius geometry or a concave elliptical or variable radius geometry. For example, FIG. 4C illustrates the relief portion 38 configured with a convex elliptical or variable radius geometry where a focal length L of the convex elliptical relief portion 38 decreases along a direction 41 opposite to the cutting direction 40 of the saw blade 10. FIG. 4D illustrates the relief portion 38 configured with a concave elliptical or variable radius geometry where a focal length L of the convex elliptical relief portion 38 decreases along a direction 41 opposite to the cutting direction 40 of the saw blade 10.

In the case where the relief portion 38 is configured with either a convex elliptical or a concave elliptical geometry, the rise portion 36 can define any of variety of geometries. For example, the rise portion 36 can be configured with an angled linear geometry, a substantially horizontal linear geometry disposed between the rise portion 36, and the relief portion 38, a variable radius geometry, a reverse curve geometry, or a variety of other geometries.

As provided above, either one or both of the rise and relief portions 36, 38 of a ramp element 32 can be configured with an elliptical or variable radius geometry. In one arrangement, either one or both of the rise portion 36 and the relief portion 38 of the ramp element 32 can be configured as having multiple (e.g., two or more) elliptical geometric elements disposed in consecutive series with each other along a length of the saw blade body 20.

For example, the rise portion 36 of a ramp element 32 can include both convex and concave elliptical portions disposed in series with each other. With reference to the embodiment illustrated in FIG. 5A, the rise portion 36 of the ramp element 32 includes a convex elliptical portion 200 disposed in series with, and proximal to, a concave elliptical portion 202. As shown, the convex elliptical portion 200 extends from a proximal location 220 of the saw blade body 20 to an inflection location 222 while the concave elliptical portion 202 extends from the inflection location 222 to a distal location 224 of the saw blade body 20. Further, with reference to the embodiment of FIG. 5B, the rise portion 36 of the ramp element 32 includes a concave elliptical portion 201 disposed in series with, and proximal to, a convex elliptical portion 203. As shown, the concave elliptical portion 201 extends from a proximal location 226 to an inflection location 228 while the convex elliptical portion 203 extends from the inflection location 228 to a distal location 230.

In another example, the relief portion 38 of a ramp element 32 can include both convex and concave elliptical portions disposed in series with each other. In the embodiment of FIG. 5E, the relief portion 38 of the ramp element 32 includes a concave elliptical portion 212 disposed in series with, and proximal to, a convex elliptical portion 214. The concave elliptical portion 212 extends from a proximal location 216 of the saw blade body 20 to an inflection location 218 while the convex elliptical portion 214 extends from the inflection location 218 to a distal location 219. In the embodiment of FIG. 5F, the relief portion 38 of the ramp element 32 includes a convex elliptical portion 240 disposed in series with, and proximal to, a concave elliptical portion 242. The convex elliptical portion 240 extends from a proximal location 244 of the saw blade body 20 to an inflection location 246 while the concave elliptical portion 242 extends from the inflection location 246 to a distal location 248 of the saw blade body 20.

In another example, the rise portion 36 and/or the relief portion 38 of a ramp element 32 can include any number of convex elliptical portions disposed in series with each other. With reference to FIG. 5C, the rise portion 36 includes a first convex elliptical portion 204 disposed at a proximal location relative to a second convex elliptical portion 206 while in FIG. 5G, the relief portion 38 includes a first convex elliptical portion 250 disposed at a proximal location relative to a second convex elliptical portion 252. In another example, the rise portion 36 and/or the relief portion 38 of a ramp element 32 can include any number of concave elliptical portions disposed in series with each other. With reference to FIG. 5D, the rise portion 36 includes a first concave elliptical portion 208 disposed at a proximal location relative to a second concave elliptical portion 210 while in FIG. 5H, the relief portion 38 includes a first convex elliptical portion 254 disposed at a proximal location relative to a second convex elliptical portion 256.

As illustrated in FIGS. 5A through 5D, the length of the ramp portion 36 is greater than the length of the relief portion 38. Such illustration is by way of example only. In one embodiment, the length of the ramp portion 36 can be less than the length of the relief portion 38. Further, as illustrated in FIGS. 5E through 5H, the length of the relief portion 38 is greater than the length of the ramp portion 36. Such illustration is by way of example only. In one embodiment, the length of the relief portion 38 can be less than the length of the ramp portion 36. These variations in the lengths of the ramp portions 36 and relief portions 38 can affect the interaction between the pressure guides of a cutting system and the saw blade 10 to adjust the non-uniform cutting pressure applied by the blade 10 to a work piece.

While the variable curve geometry of the ramp elements 32 can include a curved geometry, linear geometries can be utilized as well. In one arrangement, either one or both of the rise and relief portions 36, 38 of the ramp elements 32 can be configured with linear portions having a multiple angle structure as the variable curve geometry.

Figure 6A:
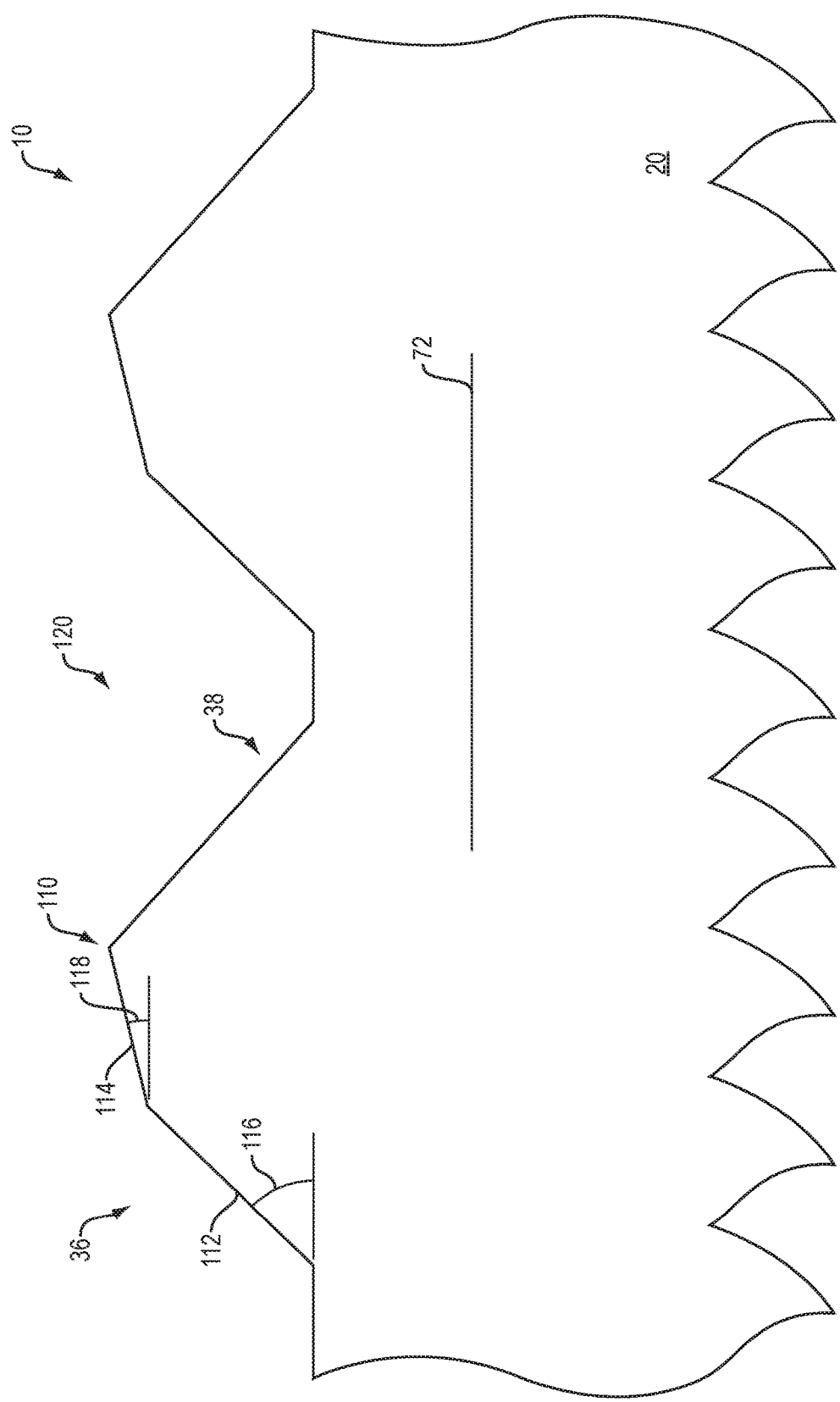
FIG. 6A illustrates a section of a saw blade having a ramp element that includes a rise portion having a multiple angle geometry and an angled relief portion, according to one arrangement.

For example, with reference to FIG. 6A, the multiple angle structure of the rise portion 36 of the ramp element 110 can include two or more linear portions 112, 114 each of which define a particular angle relative to the longitudinal axis 72 of the saw blade body 10. For example, the first linear portion 112 defines a first angle of inclination 116 relative to the longitudinal axis 72 of the body 20 and the second linear portion 114 defines a second angle of inclination 118 relative to the longitudinal axis 72 of the body 20. As illustrated, the first angle of inclination 116 is greater than the second angle of inclination 118. Such a configuration provides a substantially smooth transition between the rise portion 36 and the relief portion 38 during operation.

Figure 6B:
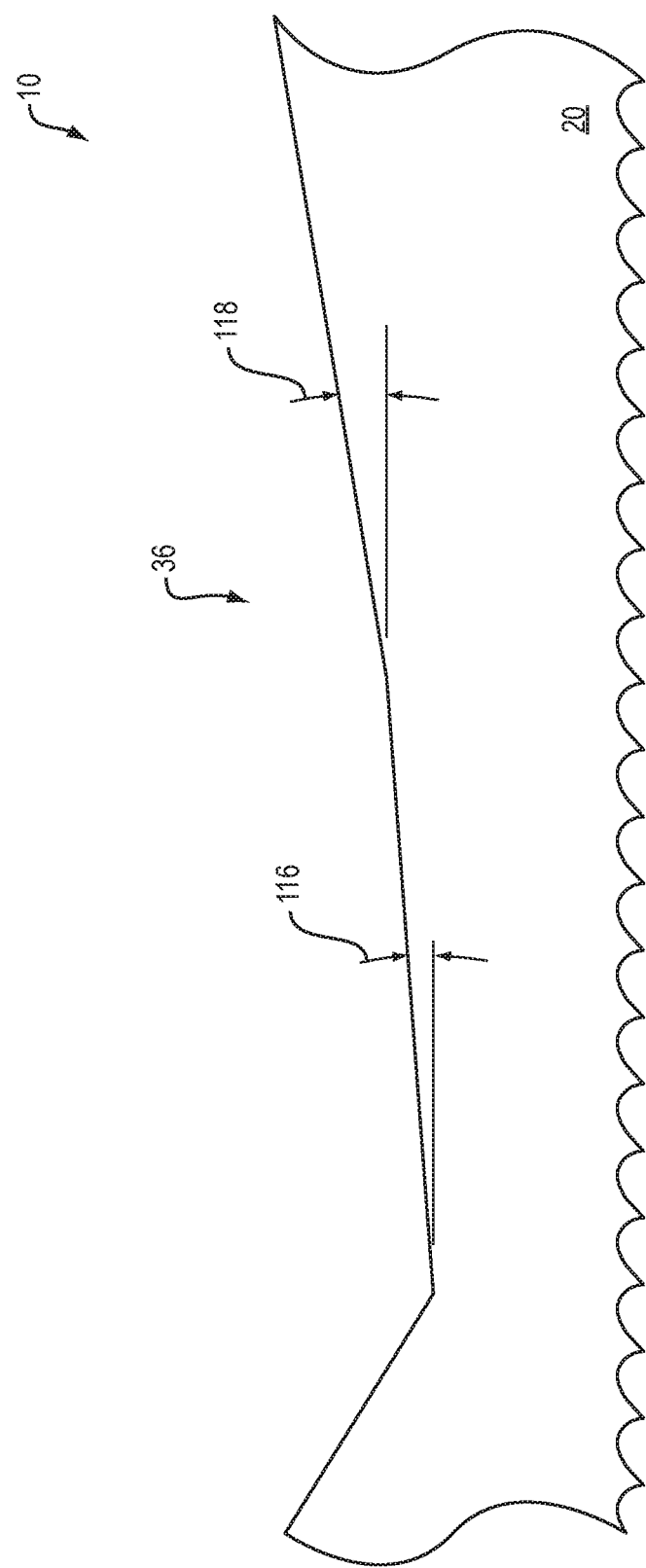
FIG. 6B illustrates a section of a saw blade having a ramp element that includes a rise portion having a multiple angle geometry, according to one arrangement.

In another example, with reference to FIG. 6B, the multiple angle structure of either the rise portion 36 or the relief portion 38 of the ramp element 110 can include two or more linear portions 112, 114 defining angles 116, 118. In the arrangement shown, the first angle of inclination 116 of the first linear portion 112 is less than the second angle of inclination 118. With such a configuration the saw blade 10 is configured to create an alternate cutting plane in the teeth of the saw blade.

The multiple angle structure of the rise portion 36 of a ramp element 32 of FIGS. 6A and 6B can be combined with a relief portion 38 having a variety of geometries.

Figure 7:
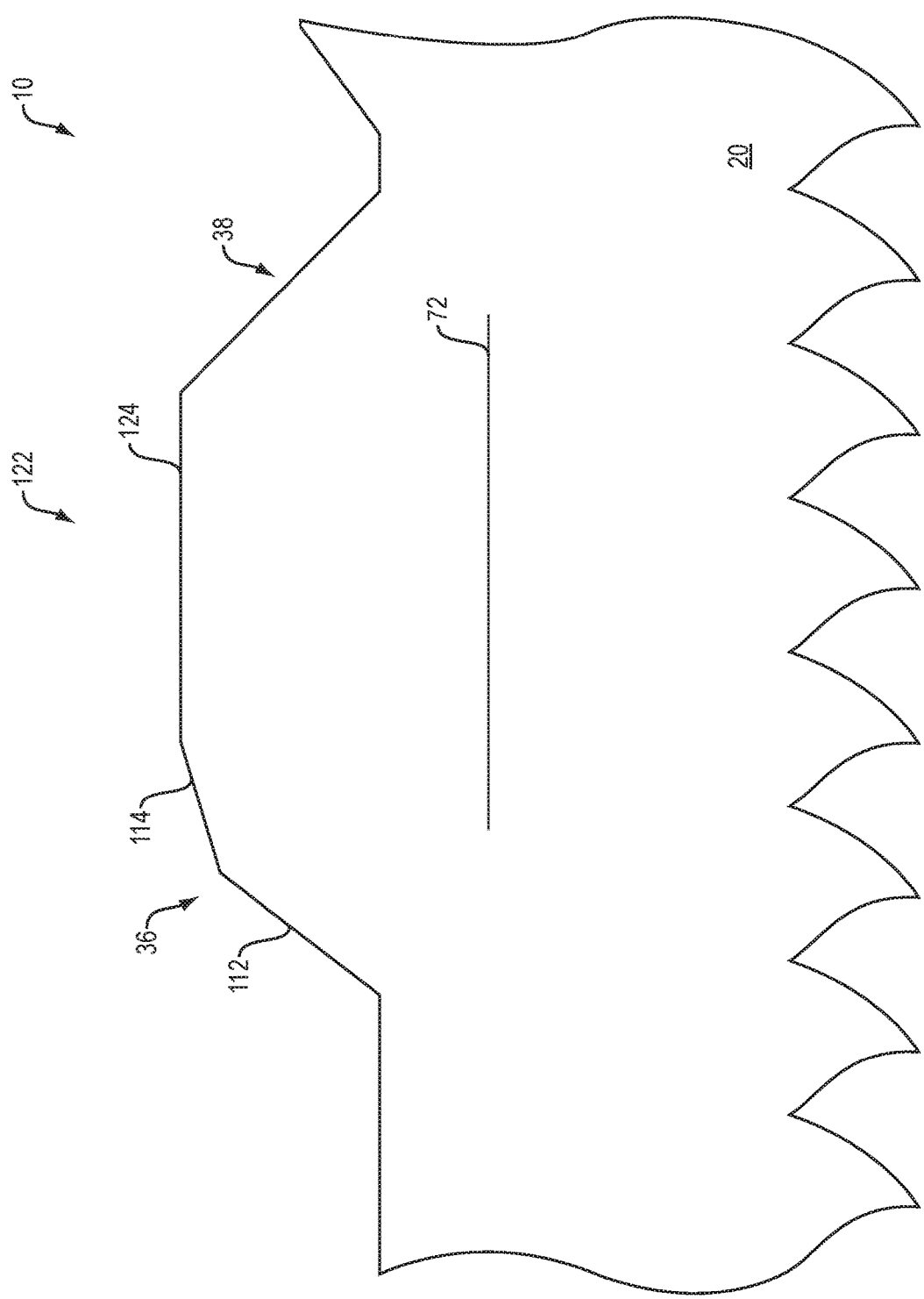
FIG. 7 illustrates a section of a saw blade having a ramp element that includes a rise portion having a multiple angle geometry, an angled relief portion, and a horizontal portion disposed there between, according to one arrangement.

For example, returning to FIG. 6A, the second linear portion 114 of ramp element 120 adjoins a relief portion 38 configured with an angled, linear geometry. FIG. 7 illustrates the rise portion 36 of a ramp element 122 as having a substantially horizontal portion 124 disposed between the second linear portion 114 and the relief portion 38 where the horizontal portion 70 is substantially parallel to the longitudinal axis 72 of the saw blade body 20.

Figure 8:
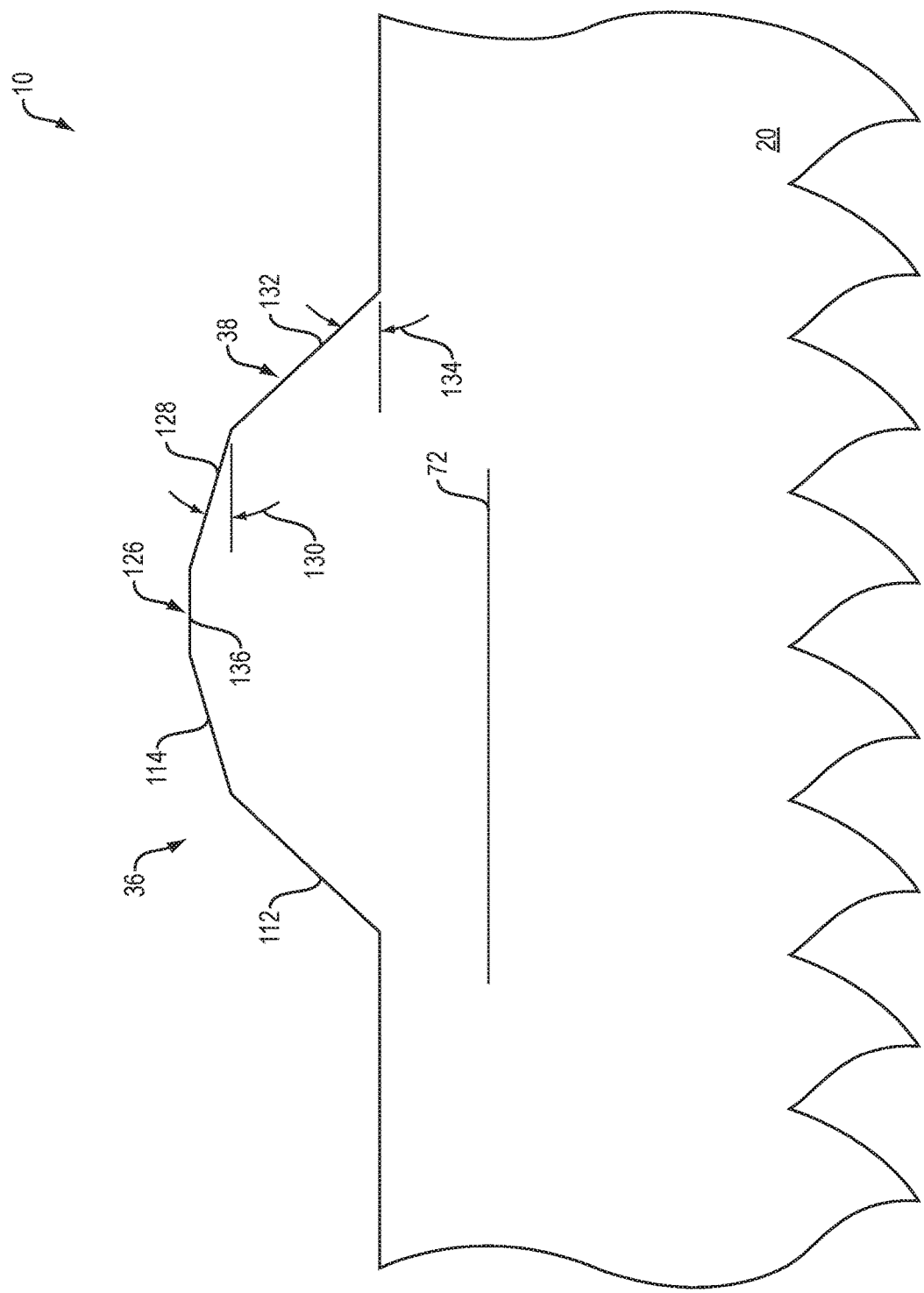
FIG. 8 illustrates a section of a saw blade having a ramp element that includes a rise portion having a multiple angle geometry, a relief portion having a multiple angle geometry, and a horizontal portion disposed there between, according to one arrangement.

In another example, FIG. 8 illustrates the relief portion 38 of a ramp element 126 as defining a linear angled structure as the multiple angle structure. As illustrated, the relief portion 38 includes a first linear portion 128 defining a first angle of inclination 130 relative to the longitudinal axis 72 of the body 20 and a second linear portion 132 defining a second angle of inclination 134 relative to the longitudinal axis 72 of the body 20. Also as illustrated, the first angle of inclination 130 is smaller than the second angle of inclination 118. Further, the ramp element 126 can include a horizontal portion 136 disposed between the second linear portion 114 of the rise portion 36 and the first linear portion 128 of the relief portion 38.

Figure 9:
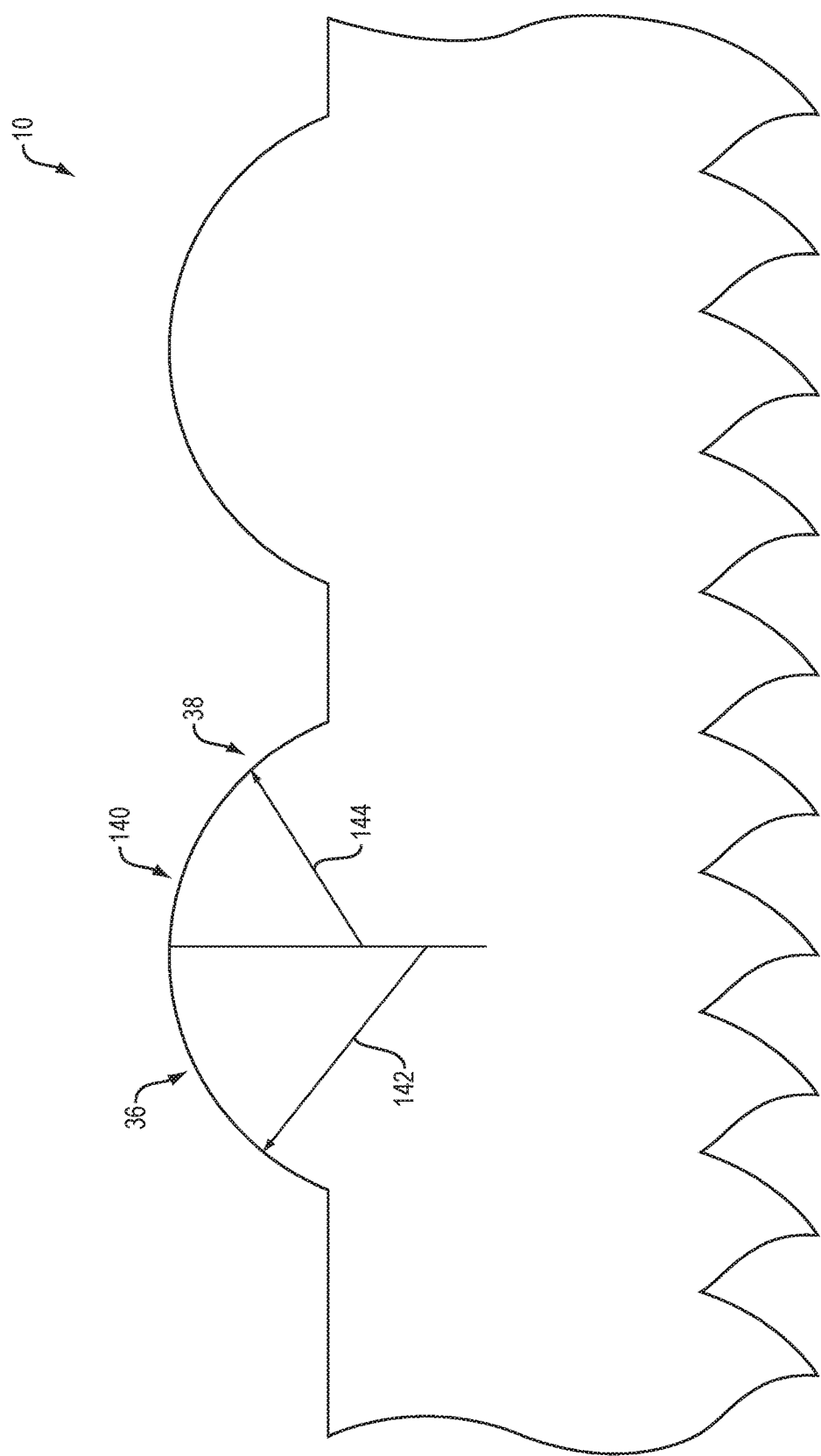
FIG. 9 illustrates a section of a saw blade having a ramp element that includes a rise portion and a relief portion that defines a multiple radius geometry, according to one arrangement.

With reference to FIG. 3A, the ramp element 44 includes both the rise portion 36 and the relief portion 38 as having compound radii. Such description is by way of example only. In one arrangement, with reference to FIG. 9, the ramp element 140 is configured with a single set compound radii distributed over the rise portion 36 and the relief portion 38. For example, in the embodiment illustrated, the rise portion 36 is defined by a first radius of curvature 142 and the relief portion 38 is defined by a second radius of curvature 144 with the second radius of curvature 144 being smaller than the first radius of curvature 60. In one embodiment, the second radius of curvature 144 can be larger than the first radius of curvature 142.

As provided above, for example with reference to FIGS. 5A through 5H the geometry the rise portions 36 and/or the relief portions 38 can include a combination of two variable curve geometries, such as convex elliptical and concave elliptical geometries. Such indication is by way of example only. In one arrangement, the geometries of the rise portions 36 and/or the relief portions 36 can include a combination of a linear portion and either convex elliptical and concave elliptical geometries as the two variable curve geometries.

For example, FIG. 10 illustrates a ramp element 32 with a rise portion 36 having a convex elliptical portion 200 disposed in series with, and proximal to, a linear portion 112, defining an angle of inclination 116 relative to the longitudinal axis 72 of the body 20. In another example, FIG. 11 illustrates a ramp element 32 with a rise portion 36 having a linear portion 112 disposed in series with, and proximal to, a convex elliptical portion 200. While not shown, the ramp element 32 can include a rise portion 36 having a concave elliptical portion disposed in series with, and proximal to, a linear portion 112 or a rise portion 36 having a linear portion 112 disposed in series with, and proximal to, a concave elliptical portion.

In another example, FIGS. 2A and 2B illustrate the rise portion 36 as being configured with a compound radius and the relief portion 38 as being configured with a linear geometry which defines an angle relative to a longitudinal axis 72 of the body 20. Such illustration is by way of example only. In one arrangement, the rise portion 36 can be configured with a linear geometry which defines an angle relative to a longitudinal axis 72 of the body 20 while the relief portion 38 can be configured with a compound radius.

In another example, FIGS. 6A and 7 illustrate the rise portion 36 as being configured with a multiple angle structure and the relief portion 38 as being configured with a linear geometry which defines a single angle relative to a longitudinal axis 72 of the body 20. Such illustration is by way of example only. In one arrangement, the rise portion 36 is configured with a linear geometry which defines a single angle relative to a longitudinal axis 72 of the body 20 and the relief portion 38 is configured with a multiple angle structure, such as described.

In another example, FIG. 3B illustrates the rise portion 36 as being configured with a reverse curve 90 and the relief portion 38 as being configured with a linear geometry which defines an angle relative to a longitudinal axis 72 of the body 20. Such illustration is by way of example only. In one arrangement, the rise portion 36 is configured with a linear geometry which defines an angle relative to a longitudinal axis 72 of the body 20 and the relief portion 38 is configured with a reverse curve.

In another example, FIG. 1 illustrates a saw blade 10, such as a band saw blade. Such illustration is by way of example only, as the saw blade 10 can be configured in a variety of geometries. In one arrangement, the saw blade 10 is configured as a ramp-back coil form saw blade having ramp elements disposed on a back edge of the body.

In the case where the saw blade is configured as a ramp-back coil form saw blade, to allow an end user to identify the position of the horizontal portion 70 relative to the rise and relief portions 36, 38, the saw blade body 20 can includes a set of visual indicators disposed in proximity to the horizontal portion 70 of a ramp element pattern 32. The presence of the horizontal portions 70 within each ramp element pattern provides a location where an end user can cut a selected portion from the coil form saw blade and can match the toothform patterns at either end of the coil form a bandsaw blade loop.

Figure 5A:
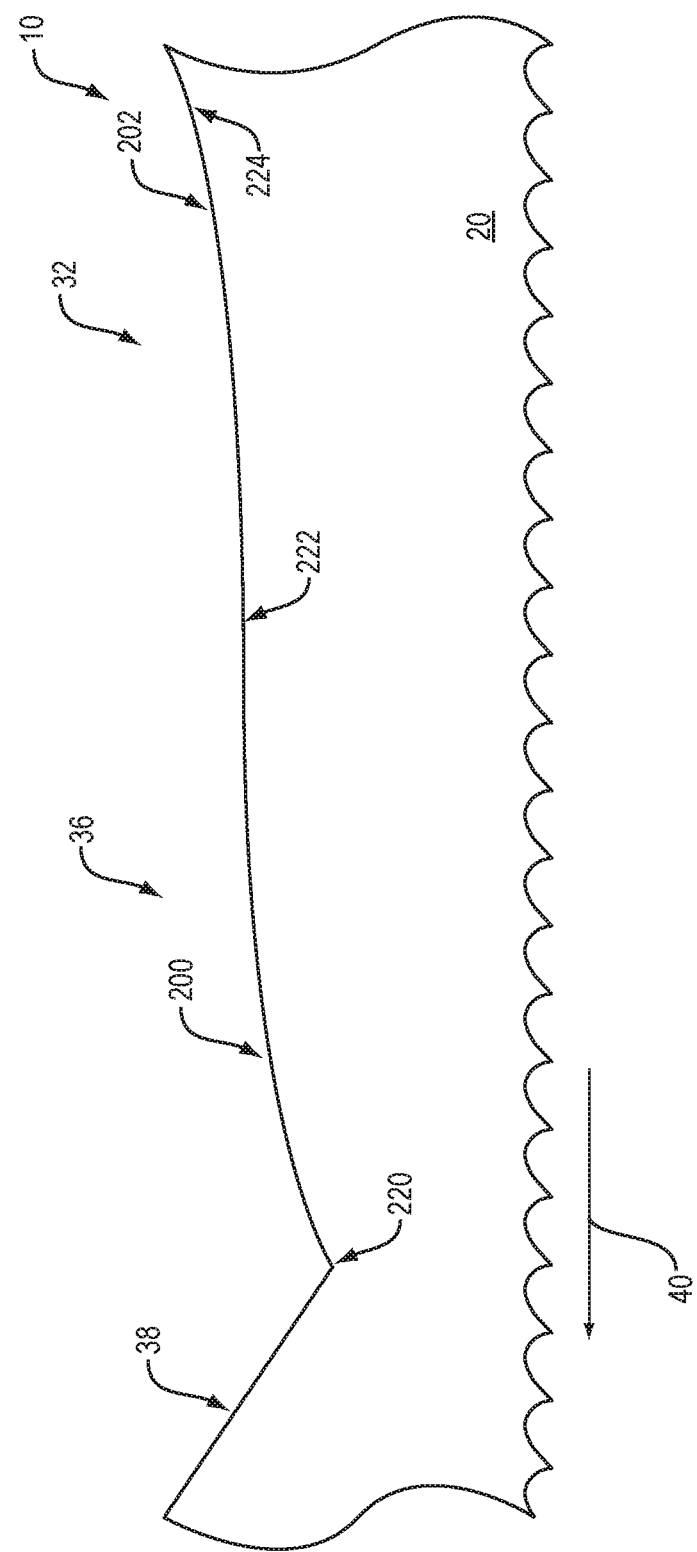
FIG. 5A illustrates a section of a saw blade having a ramp element that includes a rise portion having a convex and concave elliptical radius curve geometry, according to one arrangement.
Figure 5B:
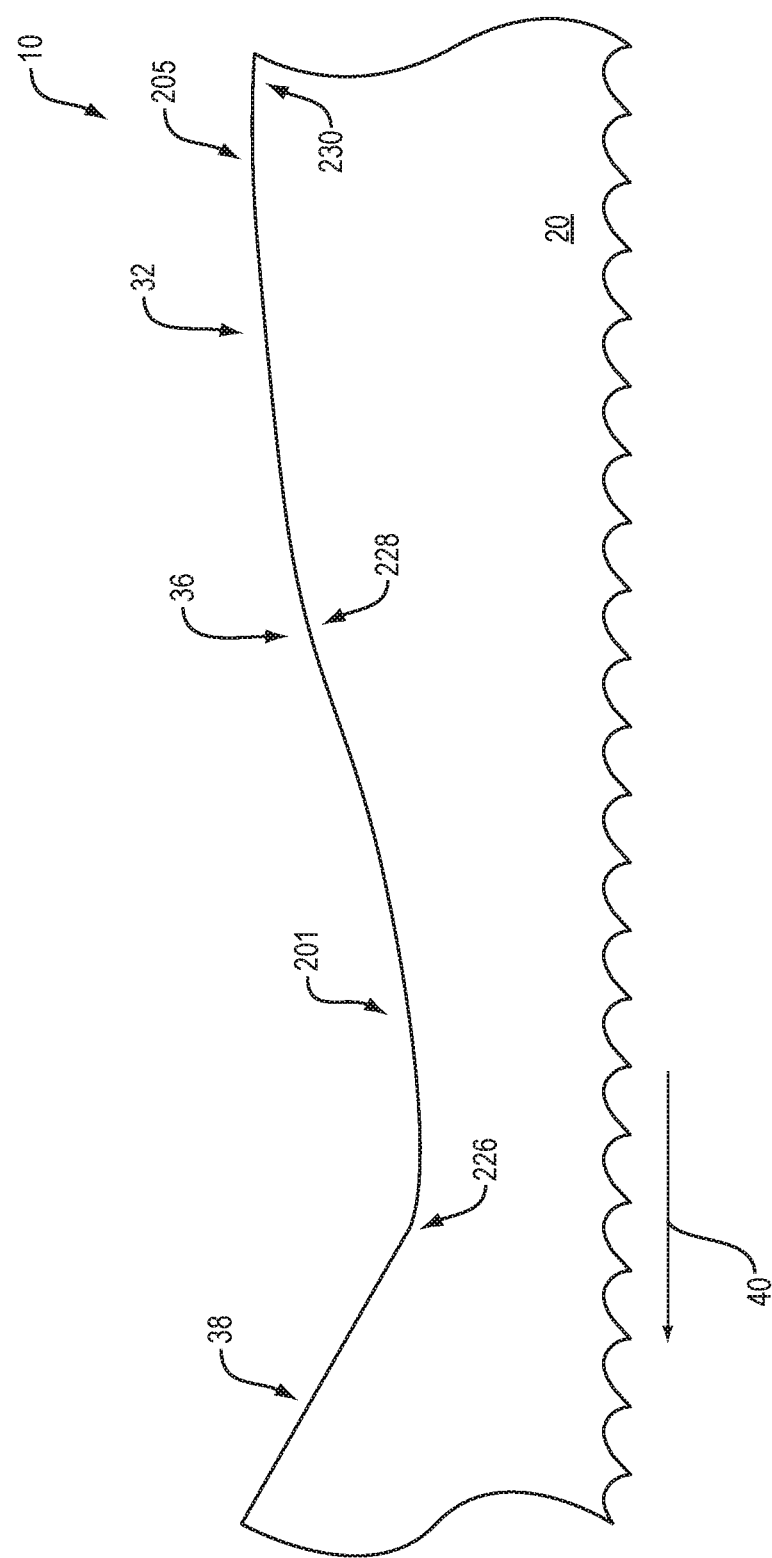
FIG. 5B illustrates a section of a saw blade having a ramp element that includes a rise portion having a concave and convex elliptical radius curve geometry, according to one arrangement.
Figure 5C:
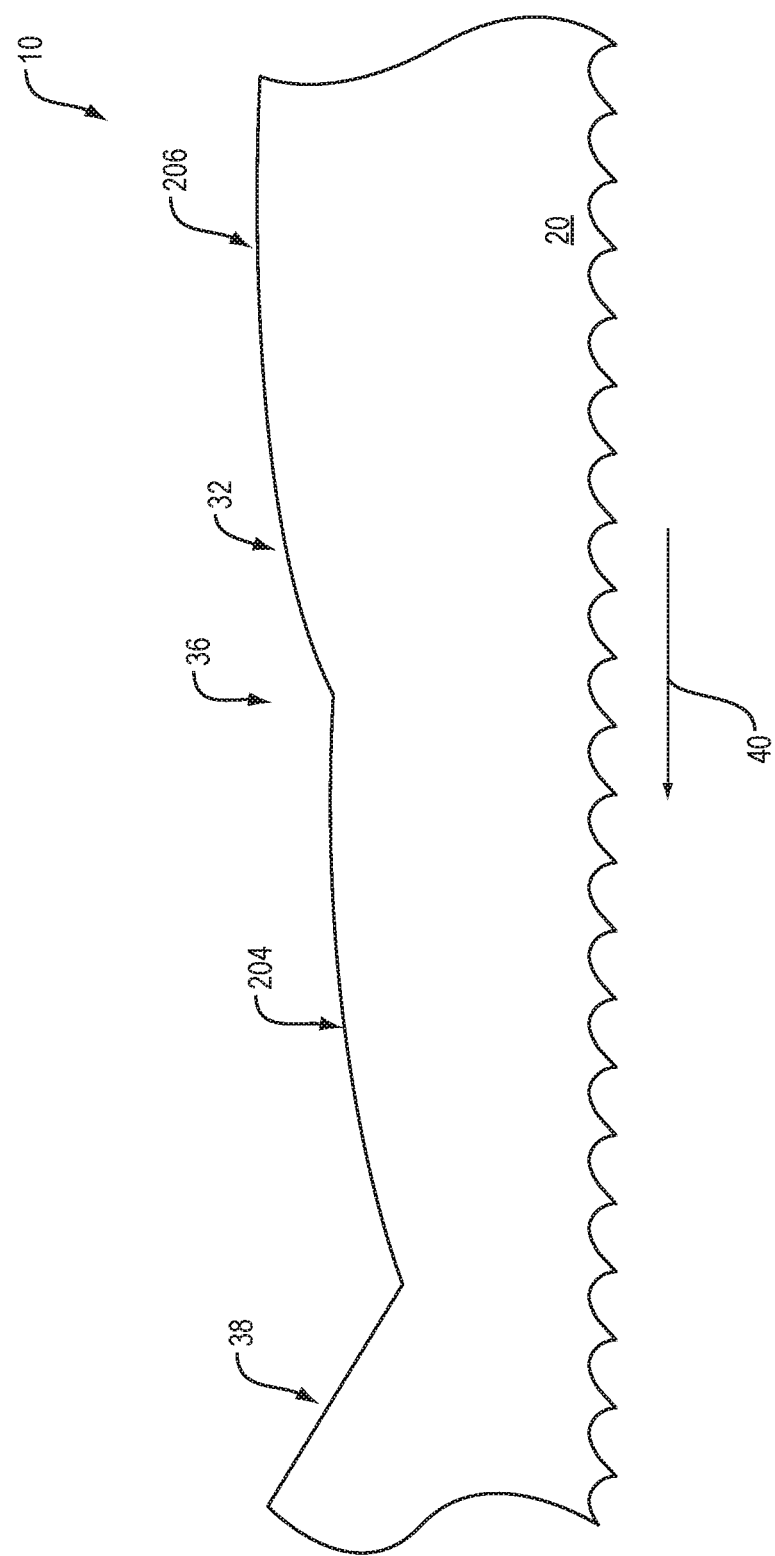
FIG. 5C illustrates a section of a saw blade having a ramp element that includes a rise portion having a first convex elliptical radius curve geometry and a second convex elliptical radius curve geometry, according to one arrangement.
Figure 5D:
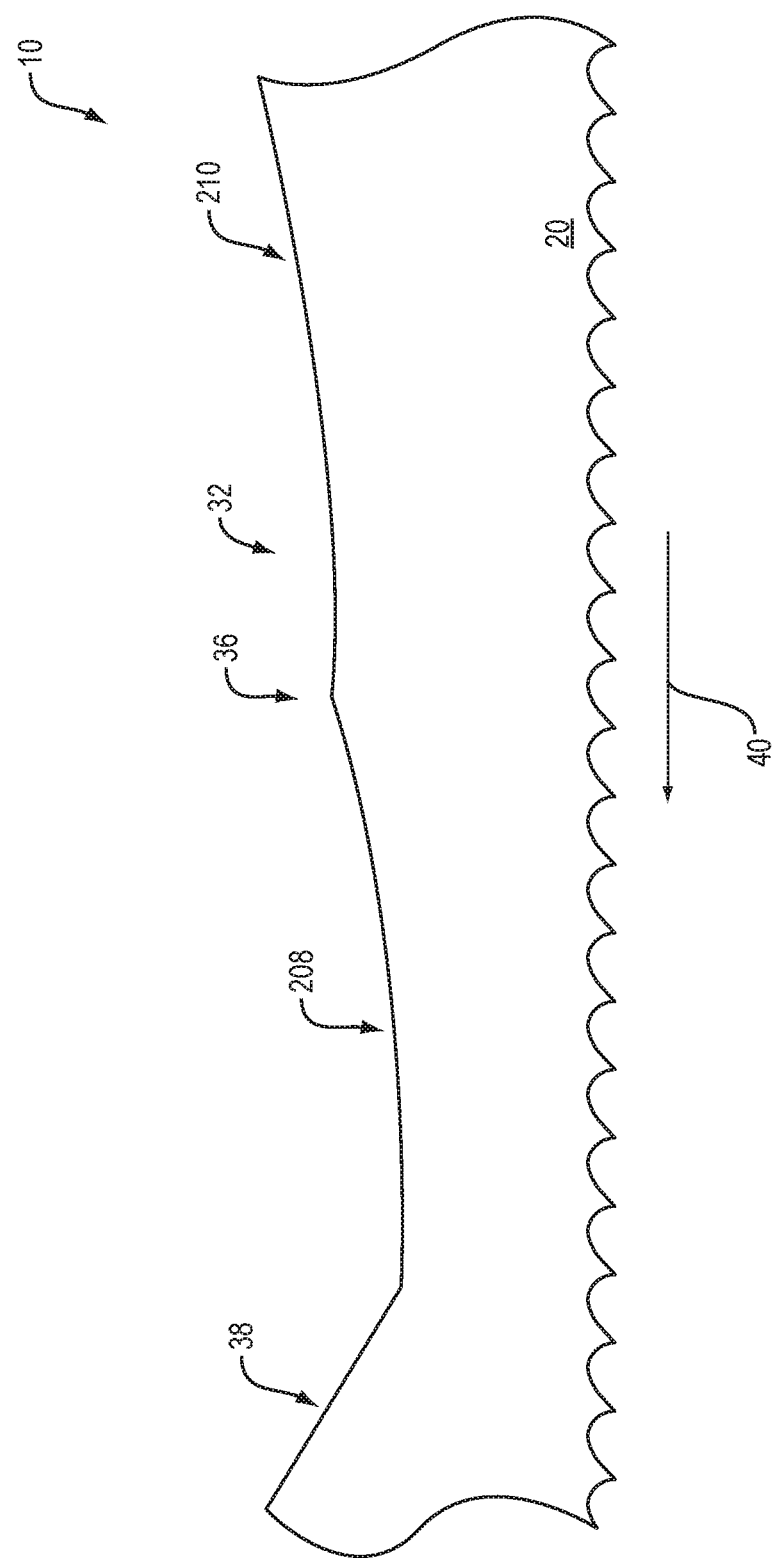
FIG. 5D illustrates a section of a saw blade having a ramp element that includes a rise portion having a first concave elliptical radius curve geometry and a second concave elliptical radius curve geometry, according to one arrangement.
Figure 5E:
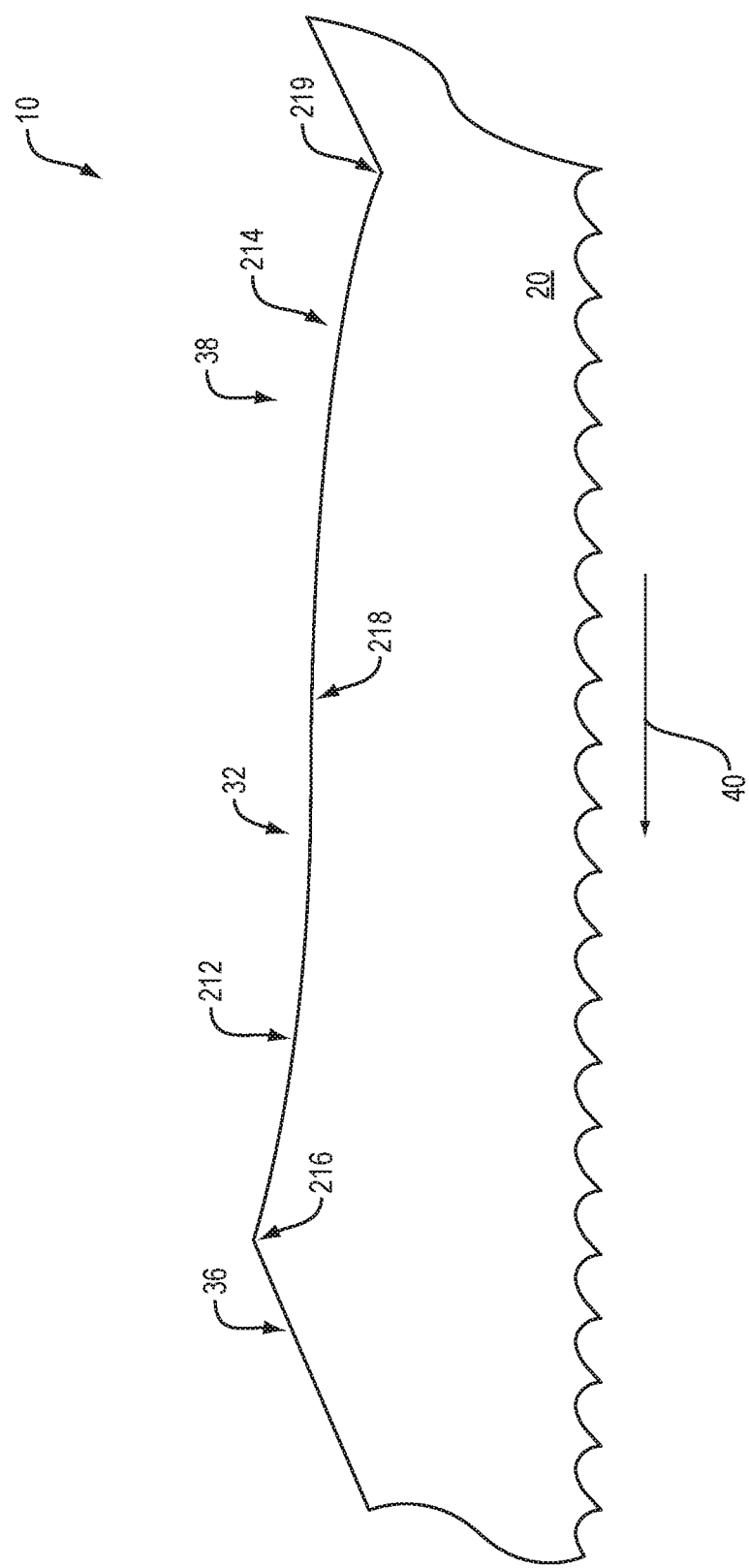
FIG. 5E illustrates a section of a saw blade having a ramp element that includes a relief portion having a concave and convex elliptical radius curve geometry, according to one arrangement.
Figure 5F:
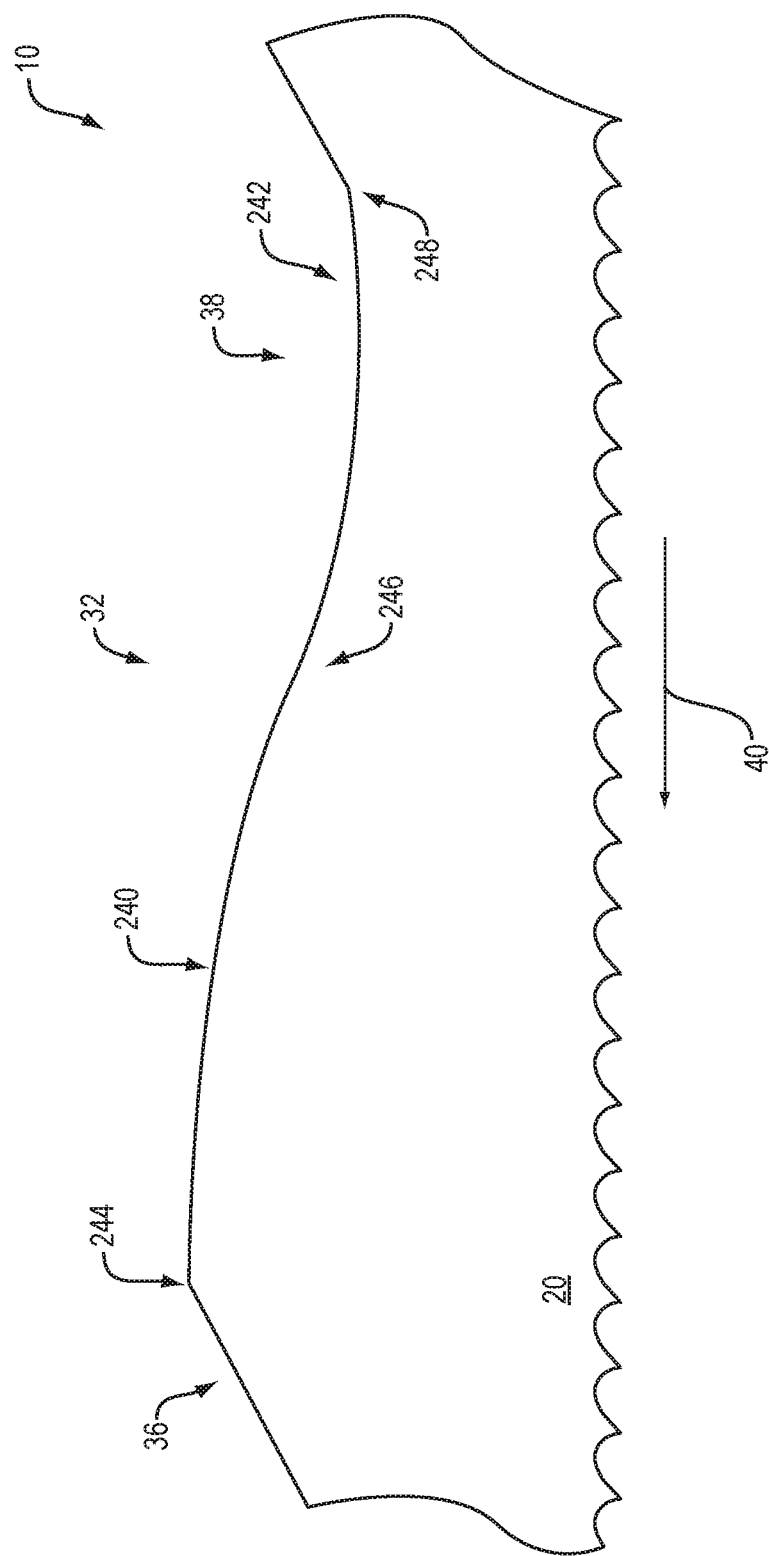
FIG. 5F illustrates a section of a saw blade having a ramp element that includes a relief portion having a convex and concave elliptical radius curve geometry, according to one arrangement FIG. 5G illustrate a section of a saw blade having a ramp element that includes a relief portion having a first convex elliptical radius curve geometry and a second convex elliptical radius curve geometry, according to one arrangement
Figure 5G:
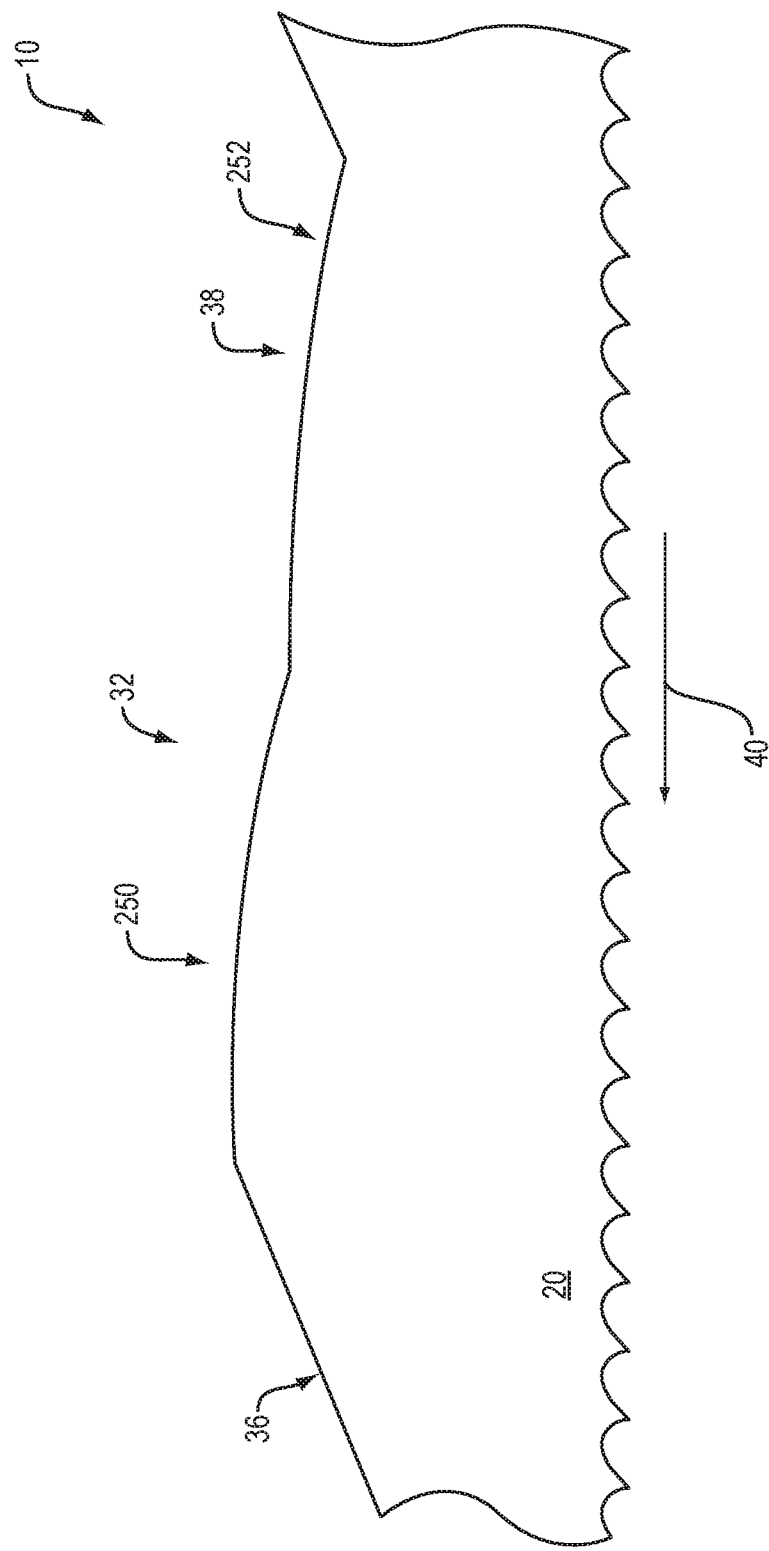
FIG. 5H illustrates a section of a saw blade having a ramp element that includes a relief portion having a first concave elliptical radius curve geometry and a second concave elliptical radius curve geometry, according to one arrangement.

In another example, FIG. 5A illustrates the rise portion 36 of the ramp element 32 includes a convex elliptical portion 200 disposed in series with, and proximal to, a concave elliptical portion 202. Such illustration is by way of example only. In one embodiment, as shown in FIG. 10, the rise portion 36 of the ramp element 32 includes a convex elliptical portion 200 disposed in series with, and proximal to, a linear portion 112 defining angle 116. Further, while not illustrated, in one embodiment, the rise portion 36 of the ramp element 32 can include a concave elliptical portion disposed in series with, and proximal to, a linear portion 112 defining the angle 116.

In another example, FIGS. 6A and 6B illustrate the multiple angle structure of the rise portion 36 of the ramp element 110 as including two or more linear portions 112, 114 each of which define a particular angle relative to the longitudinal axis 72 of the saw blade body 10. Such illustration is by way of example only. In one arrangement, as shown in FIG. 11, the rise portion 36 of the ramp element 32 includes a linear portion 112 disposed in series with, and proximal to, a convex elliptical portion 200. Further, while not illustrated, in one arrangement, the rise portion 36 of the ramp element 32 can include a linear portion 112 defining angle 116 disposed in series with, and proximal to, a concave elliptical portion.

As indicated above, the geometry of certain rise portions 36, such as illustrated in FIGS. 3B, 5A, 5B, 5C, 5D, 6A, 6B, 10, and 11, and certain relief portions, such as illustrated in FIGS. 5E though 5H, can include a combination of two variable curve geometries (e.g., linear, convex elliptical, and concave elliptical). Such indication is by way of example only. In one arrangement, the geometries of the rise portions or the relief portions can include a combination of three or more variable curve geometries.

For example, FIG. 12A illustrates a rise portion 36 having three consecutive convex elliptical portions 300, 302, 304 disposed along a direction 41 opposite to the cutting direction 40 of the saw blade 10. As shown, the convex elliptical portions 300, 302, 304 are arranged in an ascending pattern such that a distal portion 310 of the second portion 304 is disposed at a distance 314 above a distal portion 308 of the first portion 302 and a distal portion 312 of the third portion 306 is disposed at a distance 316 above the distal portion 310 of the second portion 304. In another example, FIG. 13A illustrates a rise portion 36 having three consecutively disposed concave elliptical portions 318, 320, 322 disposed along a direction 41 opposite to the cutting direction 40 of the saw blade 10. As shown, the convex elliptical portions 300, 302, 304 are arranged in an ascending pattern. While FIGS. 12A and 13A illustrate the rise portion 36 as having either consecutive convex portions of concave portions, in one embodiment, the rise portion 36 can have any combination of three or more consecutively disposed linear, convex elliptical, and/or concave elliptical portions. For example, the rise portion 36 can include a convex portion, disposed proximally to first and second concave portions or a concave portion disposed between two convex portions.

Figure 12B:
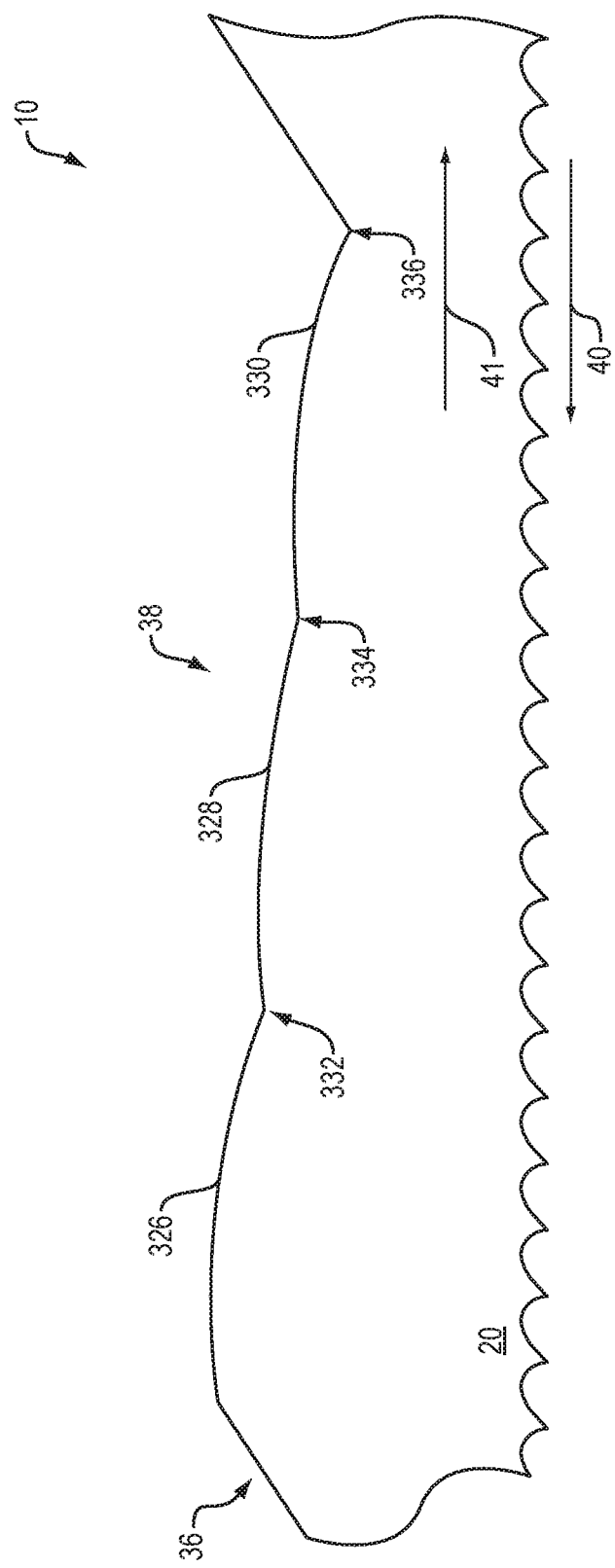
FIG. 12B illustrates a section of a saw blade with a relief portion having three consecutively disposed convex elliptical geometries.
Figure 13B:
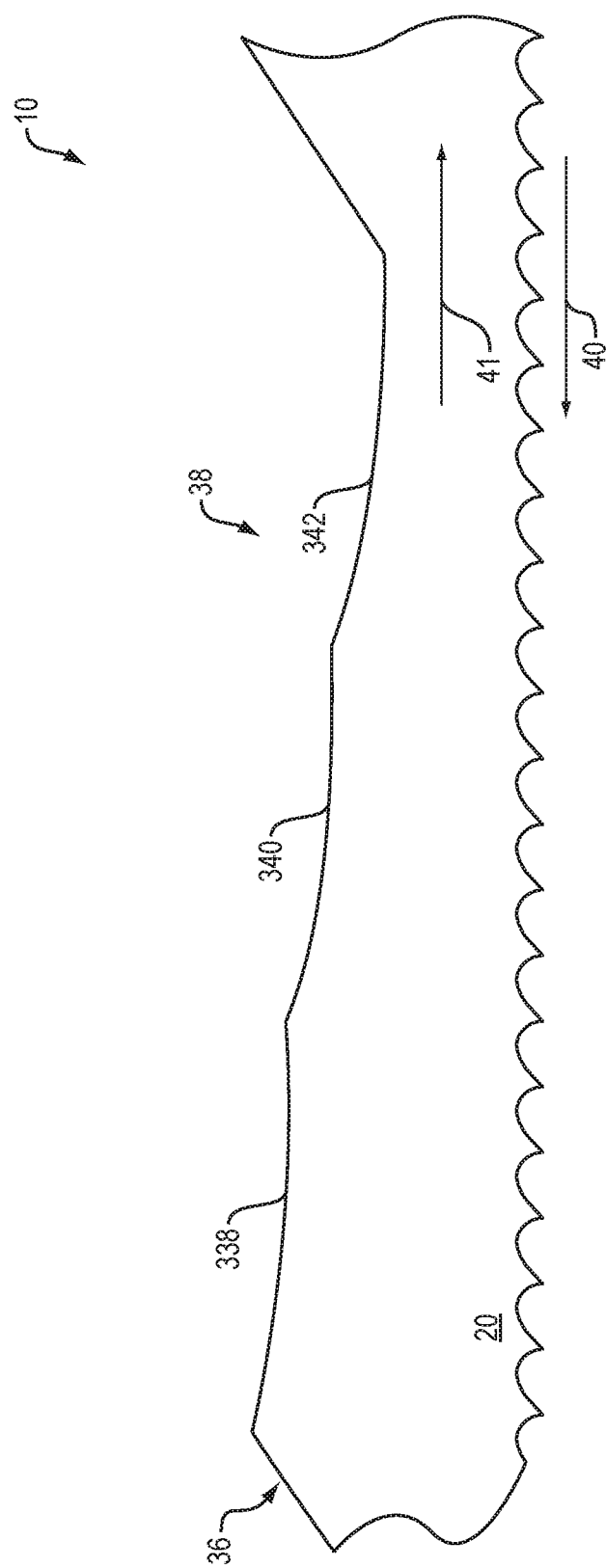
FIG. 13B illustrates a section of a saw blade with a relief portion having three consecutively disposed concave elliptical geometries.

In another example FIG. 12B illustrates a relief portion 38 having three consecutive convex elliptical portions 326, 328, 330 disposed along a direction 41 opposite to the cutting direction 40 of the saw blade 10. As shown, the convex elliptical portions 326, 328, 330 are arranged in a descending pattern such that a distal portion 334 of the second portion 328 is disposed at a distance below a distal portion 332 of the first portion 326 and a distal portion 336 of the third portion 330 is disposed at a distance below the distal portion 334 of the second portion 328. In another example, FIG. 13B illustrates a relief portion 36 having three consecutively disposed concave elliptical portions 338, 340, 342 disposed along a direction 41 opposite to the cutting direction 40 of the saw blade 10. As shown, the convex elliptical portions 338, 340, 342 are arranged in a descending pattern. While FIGS. 12B and 13B illustrate the relief portion 38 as having either consecutive convex portions of concave portions, in one embodiment, the relief portion 38 can have any combination of three or more consecutively disposed linear, convex elliptical, and/or concave elliptical portions.

Further, it is noted that the geometries illustrated in FIGS. 6A, 6B, 7, 10 and 11 are utilized as part of the rise portions 32 of a saw blade body. Such description is by way of example only. It is understood that those geometries can also be utilized as part of the relief portions 38 of a saw blade body.

While various embodiments of the innovation have been particularly shown and described, it will be understood by those skilled in the art that various changes in form and details may be made therein without departing from the spirit and scope of the innovation as defined by the appended claims.

What is claimed is:

1. A saw blade, comprising:
a body;
saw blade teeth disposed on a first edge of the body; and
a ramp element disposed on a second edge of the body, the second edge opposing the first edge, the ramp element repeated along a longitudinal axis of the body to define a ramp element pattern, the ramp element having a rise portion disposed proximal to a cutting direction of the saw blade and a relief portion disposed distal to the cutting direction of the saw blade,
wherein one of the rise portion and the relief portion of the ramp element defines a compound curve having a first portion defining a first radius of curvature and a second portion defining a second radius of curvature, the first radius of curvature being unequal to the second radius of curvature.

2. The saw blade of claim 1, further comprising a horizontal portion disposed between the rise portion and the relief portion, the horizontal portion substantially parallel to the longitudinal axis of the body.

3. The saw blade of claim 1, wherein the other of the rise portion and the relief portion defines a compound curve having a first portion defining a first radius of curvature and a second portion defining a second radius of curvature, the first radius of curvature being unequal to the second radius of curvature.

4. The saw blade of claim 1, wherein the other of the rise portion and the relief portion defines a reverse curve having a first portion defining a concave geometry with a first radius of curvature and a second portion defining a convex geometry with a second radius of curvature.

5. The saw blade of claim 1, wherein the other of the rise portion and the relief portion defines a convex elliptical geometry having a focal length that changes along a direction opposite to a cutting direction of the saw blade teeth.

6. The saw blade of claim 1, wherein the other of the rise portion and the relief portion defines a concave elliptical geometry having a focal length that changes along a direction opposite to a cutting direction of the saw blade teeth.

7. The saw blade of claim 1, wherein the other of the rise portion and the relief portion defines two or more elliptical geometric elements disposed in consecutive series along a length of the saw blade.

8. The saw blade of claim 7, wherein the other of the rise portion and the relief portion defines a convex elliptical portion disposed in series with, and proximal to, a concave elliptical portion.

9. The saw blade of claim 7, wherein the other of the rise portion and the relief portion defines a concave elliptical portion disposed in series with, and proximal to, a convex elliptical portion.

10. The saw blade of claim 7, wherein the other of the rise portion and the relief portion defines a first convex elliptical portion disposed in series with, and proximal to, a second convex elliptical portion.

11. The saw blade of claim 7, wherein the other of the rise portion and the relief portion defines a first concave elliptical portion disposed in series with, and proximal to, a second concave elliptical portion.

12. The saw blade of claim 7, wherein the other of the rise portion and the relief portion defines a first concave elliptical portion, a second concave elliptical portion, and a third concave elliptical portion, the first concave elliptical portion disposed in series with, and proximal to, the second concave elliptical portion and the second concave elliptical portion disposed in series with, and proximal to, the third concave elliptical portion.

13. The saw blade of claim 7, wherein the other of the rise portion and the relief portion defines a first convex elliptical portion, a second convex elliptical portion, and a third convex elliptical portion, the first convex elliptical portion disposed in series with, and proximal to, the second convex elliptical portion and the second convex elliptical portion disposed in series with, and proximal to, the third convex elliptical portion.

14. The saw blade of claim 1, wherein the other of the rise portion and the relief portion defines a first linear portion defining a first angle of inclination relative to the longitudinal axis of the body and a second linear portion defining a second angle of inclination relative to the longitudinal axis of the body, the first angle of inclination being unequal to the second angle of inclination.

15. The saw blade of claim 14, wherein the second angle of inclination is greater than the first angle of inclination.

16. The saw blade of claim 1, wherein the other of the rise portion and the relief portion defines a linear portion defining an angle of inclination relative to the longitudinal axis of the body and one of a concave elliptical portion and a convex elliptical portion.

* * * * *